(12) United States Patent
Fast et al.

(10) Patent No.: US 9,844,173 B2
(45) Date of Patent: Dec. 19, 2017

(54) SIDE FOLDING TOOLBAR FOR CHEMICAL APPLICATOR

(75) Inventors: Verlyn K. Fast, Bingham Lake, MN (US); James B. Prohaska, Prior Lake, MN (US)

(73) Assignee: Fast Global Solutions, Inc., Glenwood, MN (US)

( * ) Notice: Subject to any disclaimer, the term of this patent is extended or adjusted under 35 U.S.C. 154(b) by 0 days.

(21) Appl. No.: 13/563,004

(22) Filed: Jul. 31, 2012

(65) Prior Publication Data
US 2014/0034341 A1    Feb. 6, 2014

(51) Int. Cl.
*A01B 73/06*    (2006.01)
*A01B 73/04*    (2006.01)

(52) U.S. Cl.
CPC .......... *A01B 73/044* (2013.01); *A01B 73/067* (2013.01)

(58) Field of Classification Search
CPC ....... A01B 73/02; A01B 73/06; A01B 73/065; A01B 73/067
USPC .................................................. 172/311, 477
See application file for complete search history.

(56) References Cited

U.S. PATENT DOCUMENTS

| | | | |
|---|---|---|---|
| 3,690,055 A | 9/1972 | Reber | |
| 3,841,412 A * | 10/1974 | Sosalla | 172/311 |
| 4,200,255 A | 4/1980 | Schmidt et al. | |
| 4,355,689 A * | 10/1982 | Friggstad | 172/311 |
| 4,402,367 A * | 9/1983 | Couser | 172/456 |
| 4,418,762 A * | 12/1983 | Page | 172/311 |
| 4,529,040 A * | 7/1985 | Grollimund | 172/311 |
| 4,576,238 A * | 3/1986 | Spencer | 172/311 |
| 4,632,417 A | 12/1986 | Hodapp | |
| 4,739,930 A * | 4/1988 | Pask | 239/161 |
| 5,191,942 A * | 3/1993 | Bussiere | 172/286 |
| 5,641,026 A * | 6/1997 | Balmer | 172/452 |
| 5,839,516 A * | 11/1998 | Arnold et al. | 172/456 |
| 6,223,831 B1* | 5/2001 | Friggstad | 172/311 |
| 6,263,977 B1* | 7/2001 | Mayerle et al. | 172/311 |
| 6,415,873 B1* | 7/2002 | Hudgins | 172/311 |
| 7,178,605 B2* | 2/2007 | Williams et al. | 172/1 |
| 7,861,795 B2* | 1/2011 | Dillon | 172/452 |
| 2005/0087350 A1* | 4/2005 | Bauer | 172/311 |
| 2009/0250577 A1 | 10/2009 | Townson | |
| 2010/0307779 A1* | 12/2010 | Ryder et al. | 172/311 |
| 2011/0030171 A1 | 2/2011 | Hooton et al. | |
| 2011/0094202 A1 | 4/2011 | Dow et al. | |
| 2011/0131762 A1 | 6/2011 | Palen | |

(Continued)

FOREIGN PATENT DOCUMENTS

EP    0056118 A1    7/1982

*Primary Examiner* — Thomas B Will
*Assistant Examiner* — Joel F. Mitchell
(74) *Attorney, Agent, or Firm* — Christensen, Fonder, Dardi & Herbert PLLC

(57) ABSTRACT

A multi-row agricultural soil treatment implement includes a semi-trailed carriage and a rearward folding toolbar. The toolbar is suspended from the semi-trailed carriage through parallel links and includes a center section, flex hinges, main wings, main wing latches, and outer flip wings operatively connected to hydraulic cylinders to move them between transport and field position. The main wings fold rearward relative to the center section and are supported by a transport rack but they retain the ability to pivot up or down as needed for ground contour following capability or row end turning.

21 Claims, 22 Drawing Sheets

(56) References Cited

U.S. PATENT DOCUMENTS

2011/0258811 A1 10/2011 Borkgren et al.
2011/0315411 A1* 12/2011 Adams et al. ................ 172/311

* cited by examiner

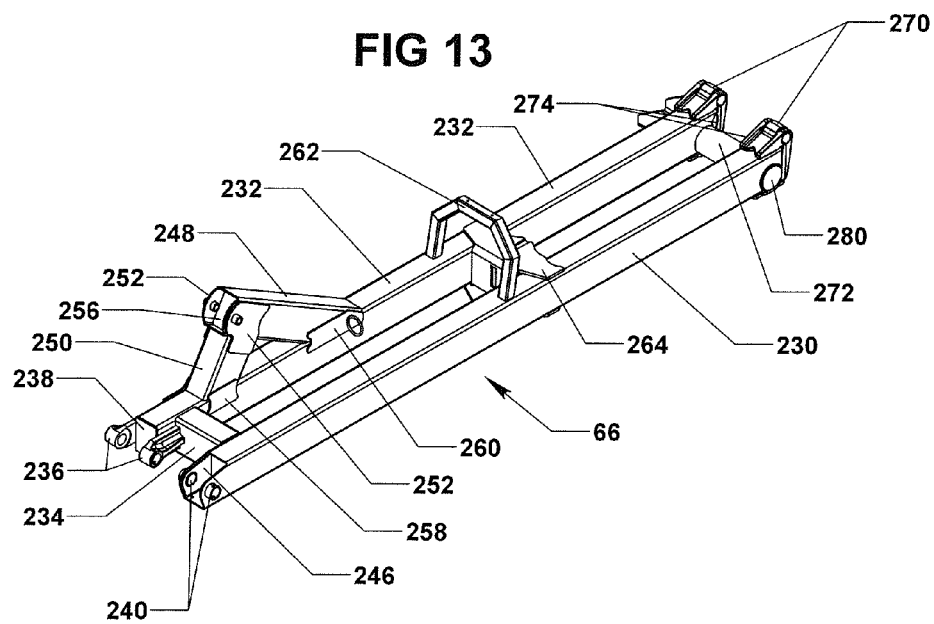
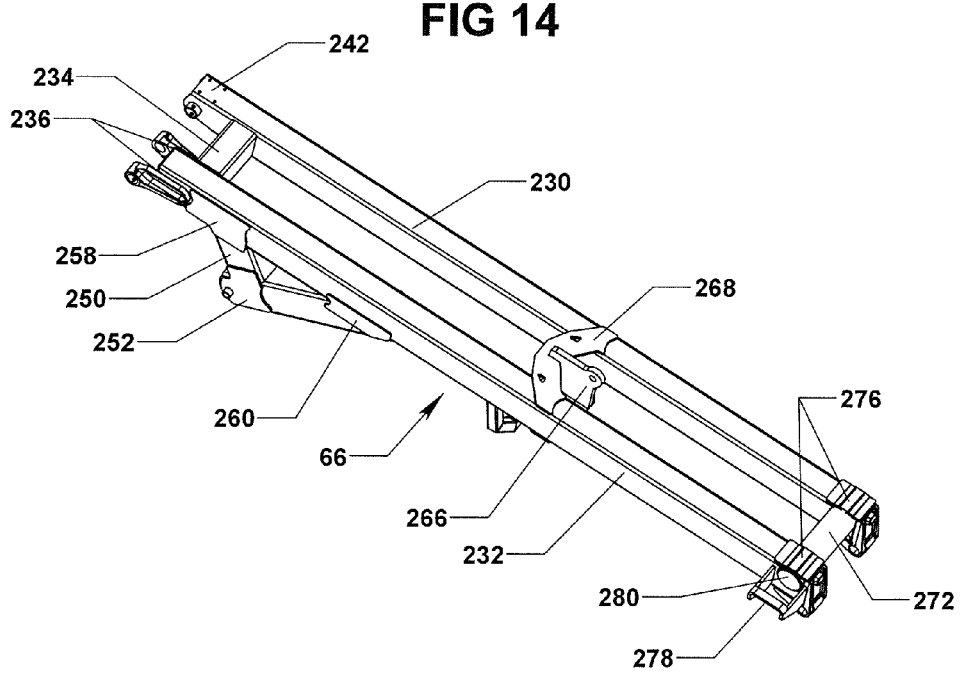

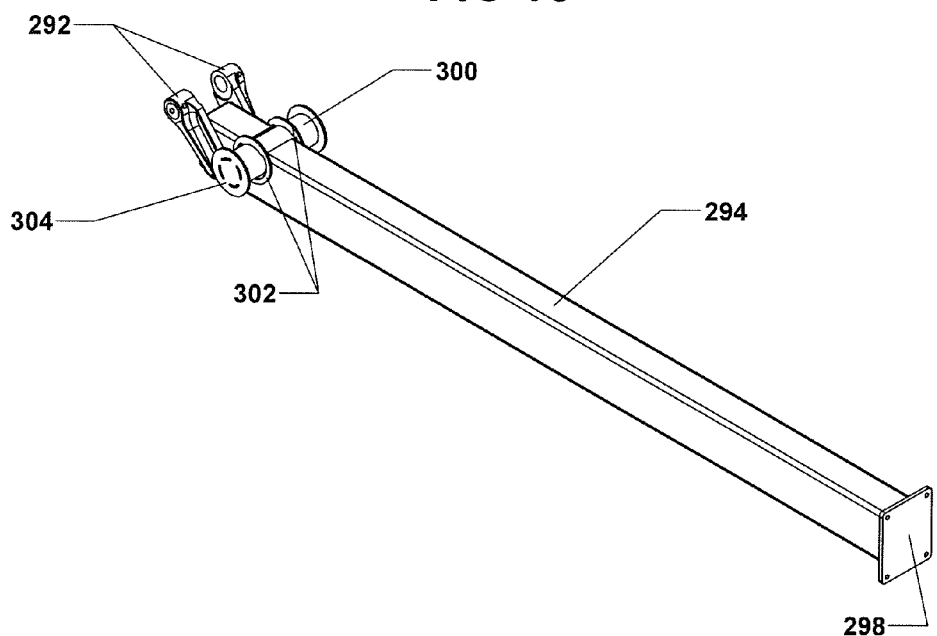
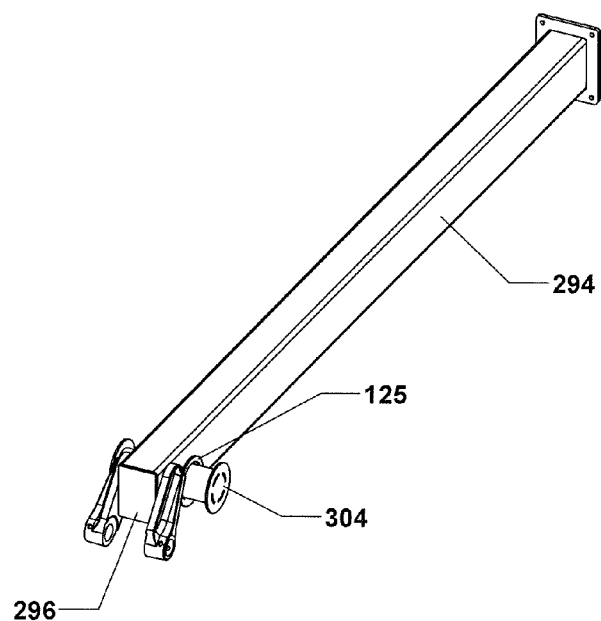

SIDE FOLDING TOOLBAR FOR CHEMICAL APPLICATOR

BACKGROUND OF THE INVENTION

I. Field of the Invention

The present invention relates generally to multi-row, wide-swath, agricultural implements such as chemical applicator implements having a laterally folding toolbar mounted to a towable carriage. More specifically the present invention includes a multi-section toolbar that folds rearward alongside a trailing carriage so as to reduce the overall transport dimensions of the implement.

II. Description of the Prior Art

Agricultural semi-trailed equipment such as, for example, chemical application equipment is used to treat a relatively wide swath of a field in a single pass. A chemical applicator generally consists of a rolling carriage that supports a vessel to carry application material and a toolbar suspended from the carriage framework. The carriage is attached to a prime mover, normally a tractor, through a load bearing pivot point at the rear of the prime mover which allows the tractor-trailer combination to articulate for steering purposes. Tools such as rolling coulters along with injection nozzles or knives are attached to the toolbar to accurately incorporate plant nutrients into the soil at desired depths and lateral increments measured from the centerline of the main carriage frame and the prime mover.

The economics of multi-row processing of chemical incorporators continuously push for increasing the latitudinal or lateral distance covered by a toolbar, commonly known as swath width, of the application equipment in an effort to reduce the number of passes required for a given area of land. In addition to increasing the toolbar's swath width, larger chemical reservoir capacities are also desired to reduce the number of time consuming reloading operations that are required. As the lengths of applicator toolbars are increased they must also have sufficient folding capabilities to collapse the overall width of the device for towing the applicator safely down a road. For narrower road transport, the conventional wide swatch toolbar is provided with a rigid center section approximately the width of the maximum overall transport dimension and multiple wing sections suspended from the center section that fold out from the center section. It is often desirable that the multiple stages of wing folds match the standard incremental swath width of the corresponding planting equipment so as to enhance the toolbar's versatility. Suspending the wings laterally from the center section eliminates the need for a wheel lift assembly to carry the wing sections in the raised position thereby reducing the amount of crop damage that can occur while turning at the row ends.

To further enhance producer profitability with chemical applicators it is also desirable to minimize the lateral deviation of nutrient placement relative to the plants as well as minimizing plant damage from the trailing carriage assembly caused by off-tracking. Off-tracking is a common characteristic of fixed axle semi-trailed equipment whenever the refraction angle at the hitch point deviates from an aligned position such as during turning or when steering corrections are necessary. Implement off-tracking is also exaggerated on trailing equipment when it is traversing a side slope where gravitational force tends to pull or slide the trailer down the slope causing the centerline of the implement to deviate from the center line of the prime mover. Whatever the cause for off-tracking the result is a substantial risk of increased crop damage and yield loss whenever a fertilizer applicator deviates from the center of the crop swath.

Off-tracking has been minimized previously by keeping the incorporation toolbar as close to the prime mover as possible. This means that the toolbar is often coupled to the carriage as far forward as possible, typically in a mid mounted position between the forward most wheels of the rolling carriage and the rear wheels of the prime mover. A mid-mount toolbar design generally requires the center section of the toolbar to transverse beneath the carriage hitch that is fastened to the drawbar of the prime mover.

To further reduce costly crop damage while turning at the row ends, the minimum toolbar lift height, measured from the ground to the lowest point of the toolbar's incorporation tool, should exceed the height of the crop to which the fertilizer is being applied. However, on mid mounted toolbars the lift height of a mid mounted toolbar is restricted by the height of the carriage hitch. This lift height is further diminished on successive wing sections relative to the center section due to the gravitational and inertial forces that cause wings to sag or dip when the applicator is turned around on the row ends. To enhance the lift height of the toolbar during such turns it is a common industry practice is to slightly elevate or pivot the outer wings up. This method of raising the outer wings works relatively well with prior mid-mounted toolbars because the wings are generally pivotally secured about a horizontal axis and the method of slightly lifting the wings on the end rows is similar to folding the wing for applicator transport.

However, a major problem associated with the conventional vertical folding toolbars is the excessive height of the folded wings in the transport position which thereby increases the possibility of striking overhead obstacles during road transport.

A further problem associated with prior folding toolbars is that during field incorporation they do not have sufficient vertical travel laterally among the toolbar sections to compensate for rolling terrain such as hills, draws, or terraces.

SUMMARY OF THE INVENTION

The present invention provides an agricultural side folding towed carriage and toolbar system in which outer wings fold both vertically and laterally rearward alongside the carriage to package a wide swath mid-mounted toolbar into a minimal transport profile for safer travel on public roadways. In the deployed unfolded field position, the wing sections are aligned in an end to end manner parallel to the center toolbar section.

The towed carriage portion of the invention functions as a rolling carrier frame for the chemical storage reservoir as well as the supporting structure for the multiple section folding toolbar. The carriage is pivotally attached to the rear of prime mover through a load bearing hitch which allows the tractor-trailer combination to articulate for steering purposes. The hitch is significantly elevated on the carriage to allow clearance for the center section of the rearward folding toolbar to pass below it. A tube assembly traversing the back side of the carriage and extending laterally past the outer sides of the storage reservoir is fixed to the carriage to vertically support and horizontally secure the rearward folded wing sections in the transport position.

The rearward folding toolbar includes a laterally rigid mid mounted center toolbar section that is disposed transversely to the direction of travel and allowed to translate vertically through parallel links and corresponding hydraulic actuators pivotally secured to the trailing carriage and the toolbar. A pair of first wing sections extends out from the sides of the center section flanking the center section. These are also known as main wing sections. Each main wing section is suspended from the outer end of the center section by a hinge assembly in the form of a flex hinge. The flex hinges located between the main wings and the center section allow the main wing sections to be pivotally secured to the center section along a vertical axis that enables folding of each main wing rearward into a transport disposition as well as allowing rotation along a horizontal axis for field application in varying land contours.

A hydraulic cylinder or other actuator operatively secured to the bottom side of the outer end of the center section and the flex hinge assembly is used to rotate each flex hinge assembly to thereby fold each main wing forward into the aligned field position or rearward into the transport position. A latch mechanism and hydraulic cylinder are pivotally pinned to a leading main tube member in the toolbar center section to mechanically secure each side folding main wing parallel to the center section for field operation. The latch mechanism consists of a plate weldment with a radius indentation that rotates vertically on a horizontal axis about the end of the center section by means of a pivotally secured hydraulic cylinder. With each main wing section aligned end to end with the center section in the field position, the radius indentation of each latch assembly is lowered over a cross pin that is secured to the beginning of each leading main wing section tube and axially aligned with the horizontal hinge on each flex hinge assembly. This configuration allows a latch to secure each main wing section in the forward, aligned, field position while still permitting each main wing section to pivot vertically about its horizontal hinge for ground contour following and row end wing tilt capabilities.

Each main wing section is flanked by an outer foldable wing section that consists of a single tube pivotally secured about a horizontal axis perpendicular to the lateral swath of the toolbar. With this folding hinge configuration the outer wing rotates vertically about 170 degrees to fold from a field position that is aligned with the main wing to a transport position such that it rests on top of the corresponding adjoined main wing section. If a narrower swath width is desired for incorporation, it is acceptable to operate the toolbar with the main wing section in the deployed field position and the outer foldable wing sections stored in the transport position. If a wider swath width is desired, each outer foldable wing section may be provided with a bolt-on tube extension to increase the length of the outer foldable wing.

A double acting hydraulic cylinder or other actuator is located on top of the toolbar and pivotally secured along the horizontal axis of each flex hinge and main wing section to supplement the gravitational force applied to the wing sections. These cylinders are used to transfer the weight of the carriage and chemical volume onto the main wing sections to provide down force on incorporation tools on the main wing sections and outer wing sections to force them into the soil when the implement is in the deployed field position. The percentage of weight that is transferred through the cylinder to the main wing can be controlled and adjusted using a hydraulic pressure reducing/relieving valve. When the operation of each of these same cylinders is reversed, it provides the force required to rotate each main wing section about the corresponding flex hinge's horizontal axis thereby lifting the outer wings slightly as desired during turning at the row ends with the toolbar in the deployed field position.

BRIEF DESCRIPTION OF THE DRAWINGS

FIG. 13 is a perspective view of a toolbar main wing section;

FIG. 14 is a perspective view of the main wing section as in FIG. 13 illustrating the underside components not visible in FIG. 13;

FIG. 16 is a perspective view of an assembled flip or outer wing section;

FIG. 17 is a perspective view of the outer or flip wing section of FIG. 16 illustrating the opposite end components not visible in FIG. 16;

DETAILED DESCRIPTION

The following description details one or more embodiments to illustrate the principles of the invention. The embodiments are presented as examples but not as limitations as those skilled in the art will recognize that other implements may make use of the principles of the toolbar of the invention and that it may take other forms while remaining within the confines of the inventive concepts. For example, while actuators may be described as hydraulic cylinders, it will be understood that any type of operator that could be used is also contemplated including pneumatic or electric cylinders or rotary actuators in some cases.

The present invention provides an improved wide swath toolbar consisting of a center section, flanked by flex hinge mounted side folding main wing sections, and vertical folding outer wing sections. The arrangement advantageously places the center toolbar section in close proximity to the rear wheels of the prime mover and in front of a trailing carriage assembly to minimize toolbar off-tracking.

The invention provides a fertilizer applicator, or the like, with a toolbar that folds rearward along side of the trailing carriage to increase the application swath width while reducing the overall height when transporting the assembly between fields.

Another advantage of the invention is to provide a toolbar where the wing sections adjacent to the center section fold laterally rearward for transport thereby reducing overall height for transport between fields while still providing sufficient vertical motion to allow for varying field contours during field deployment.

A further advantage of the invention is to secure the laterally folding wings forward in the field position with a mechanical latch that permits rotation about the hinge axis to also allow wing translation in the vertical direction and to provide hydraulic down force on the folding wings to simulate a multiplication of vertical gravitational loading. In addition, the toolbar provides a means to tilt the main wing sections slightly upward during turning at row ends to enhance the main wing and outer wing crop clearance.

Figure 1:
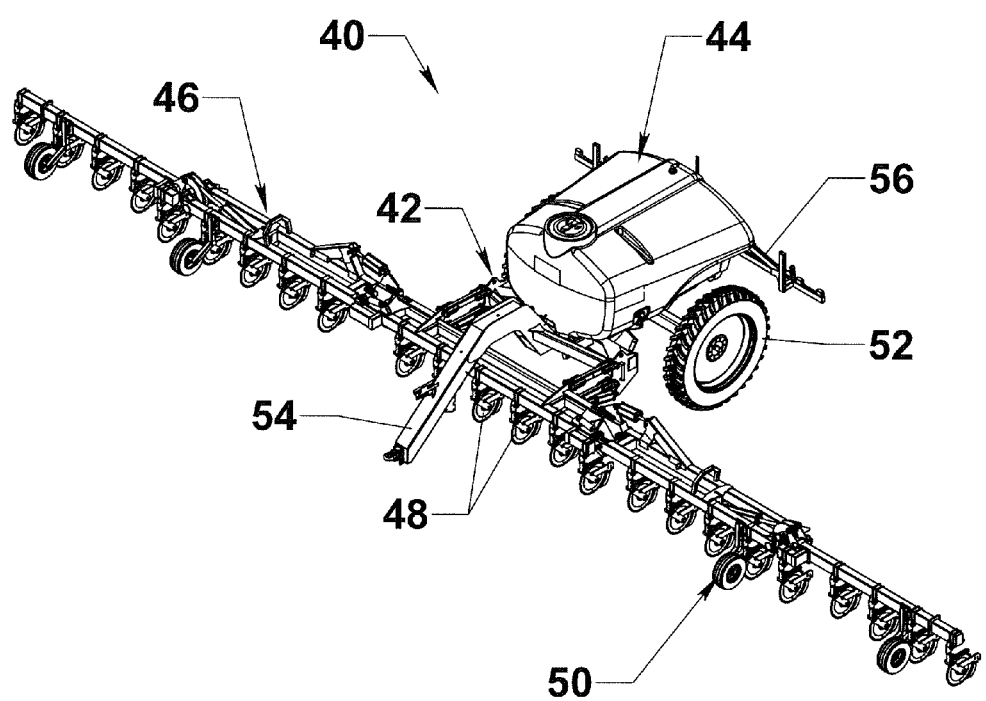
FIG. 1 is a front perspective view of a side folding chemical applicator system in accordance with the invention with the toolbar in a deployed field operating position.

Agricultural semi-trailed chemical and similar applicators in accordance with the present invention all have features in common. A perspective view of a side-folding chemical applicator system is shown in FIG. 1 in a deployed field operating position shown generally at 40. The system includes a carriage assembly 42 which supports a chemical reservoir vessel 44 and a toolbar assembly 46. The chemical reservoir vessel 44 stores a mixture of plant nutrients that are to be evenly distributed using incorporation tools commonly, but not limited to, rolling coulter devices as illustrated at 48 mounted along the toolbar assembly 46. Gauge wheel assemblies 50 are usually installed on the toolbar assembly 46. They provide a groove to control the maximum depth of plant nutrient placement into the soil. The carriage assembly 42 is supported by a rolling assembly consisting of a plurality of wheels and tires, one of which is shown at 52, or track assemblies (not shown). The remaining resultant forces are typically supported by an elevated or arched hitch assembly that protrudes from the front of the carriage assembly 42 above the toolbar assembly 46 and includes a hitch 54 designed to be pivotally attached to the rear of a prime mover (not shown) in a conventional manner.

Figure 2:
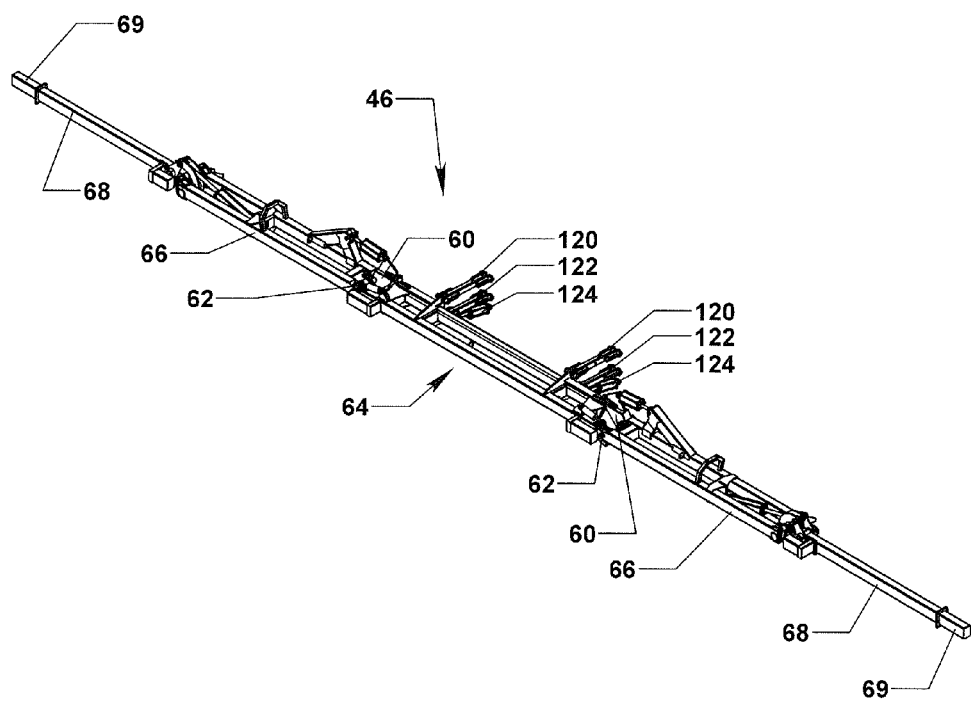
FIG. 2 is a perspective view of the toolbar assembly of the applicator in FIG. 1.

Important aspects of the present invention generally reside in the transport rack 56 that is attached to the carriage assembly 42 and in the toolbar assembly 46. A toolbar assembly 46 is shown in FIG. 2 and includes a pair of flex hinge members 60 and wing latch 62, located on both outboard ends of a center section assembly 64, that allow sections of the toolbar to be aligned for field use and folded rearward for transport as shown in the enlarged view of FIG. 3. The transport rack 56 and the toolbar assembly 46 are described in greater detail below.

Figure 4:
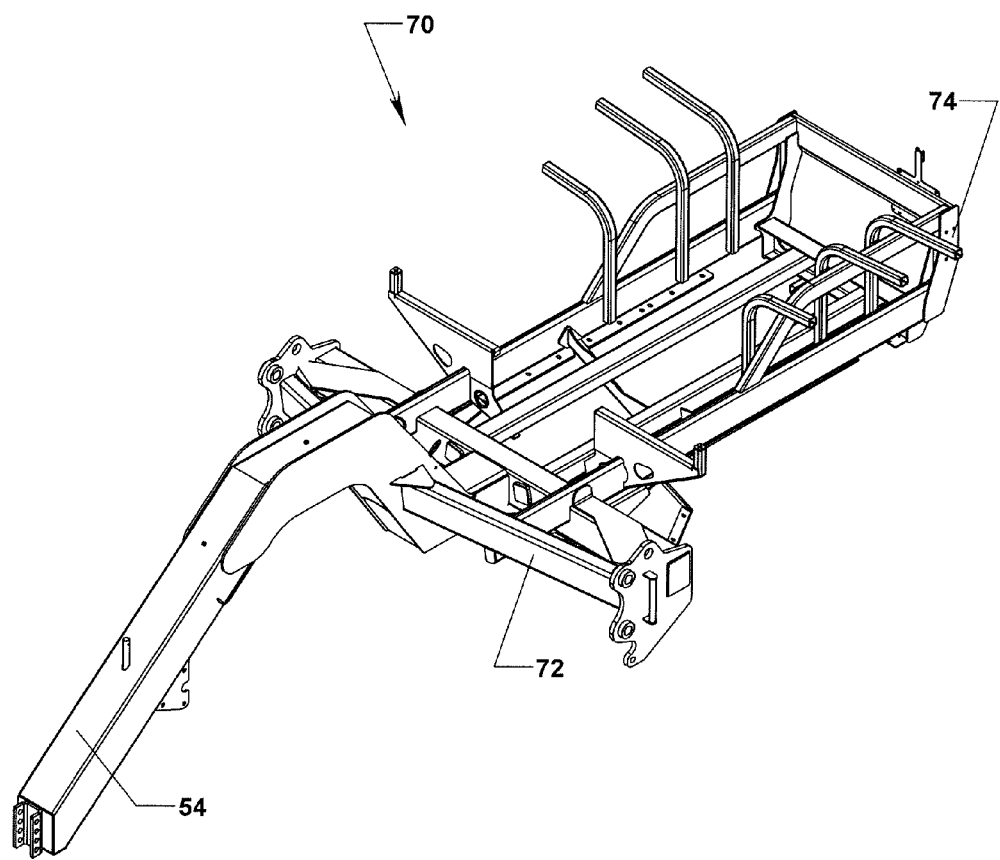
FIG. 4 is a perspective view of a carriage assembly frame.

An exemplary carriage frame assembly 70 is shown in FIG. 4 and is mainly constructed of, but not limited to, rectangular tubing, as at 72, round tubing, as at 74, formed plates, profile plates, and other shaped steel members arranged in a manner that effectively supports relatively heavy gravitational loads incurred from the chemical reservoir 44 of FIG. 1 and the toolbar assembly 46 through the wheels 52 and the carriage hitch assembly. It will be appreciated that a variety of carriage frame configurations may be used depending on the shape and size of the chemical reservoir vessel or other storage tank.

Figure 5:
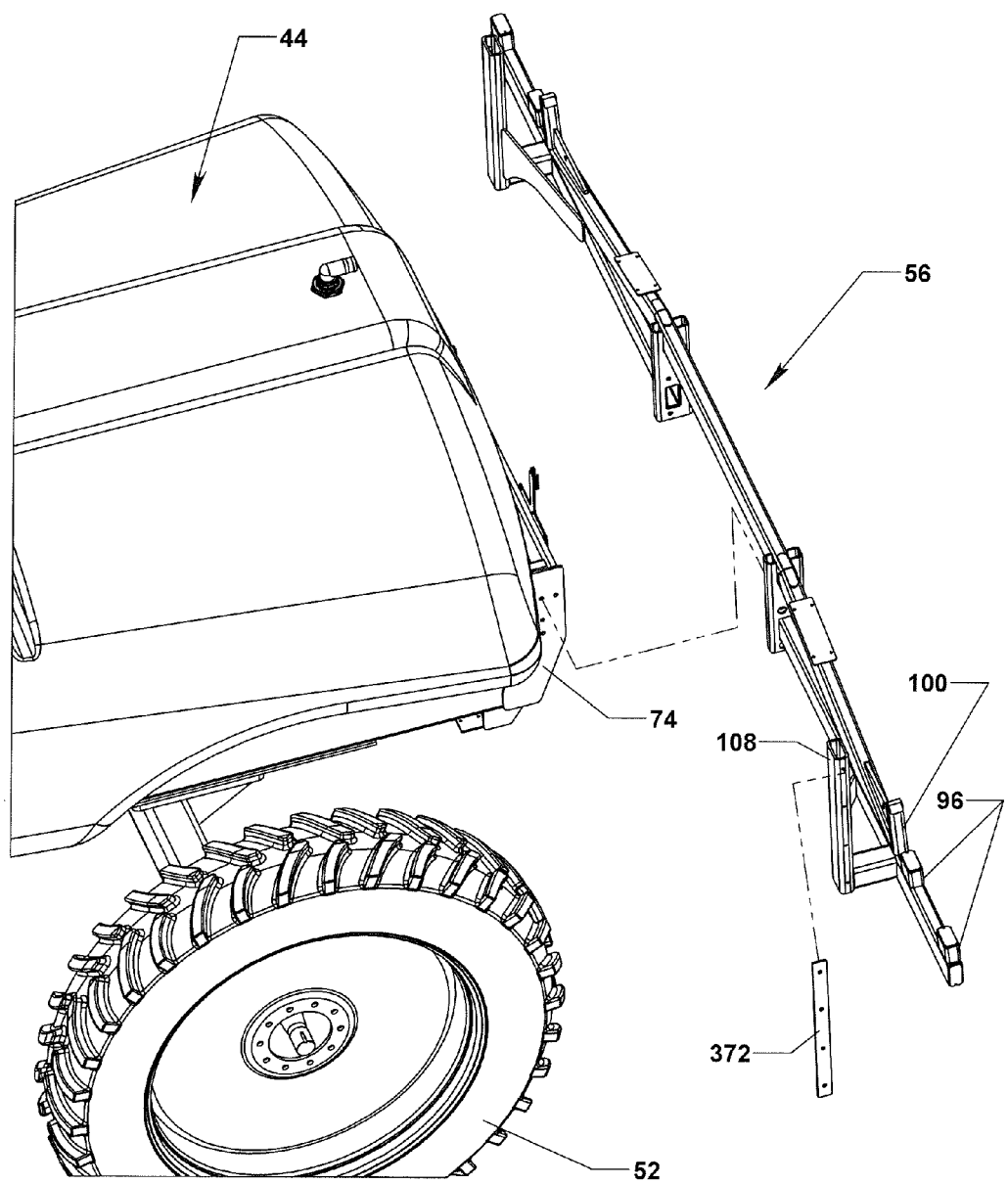
FIG. 5 is a greatly enlarged fragmentary perspective view of the rear portion of the semi-trailer assembly of the applicator with a transport rack shown detached.
Figure 6:
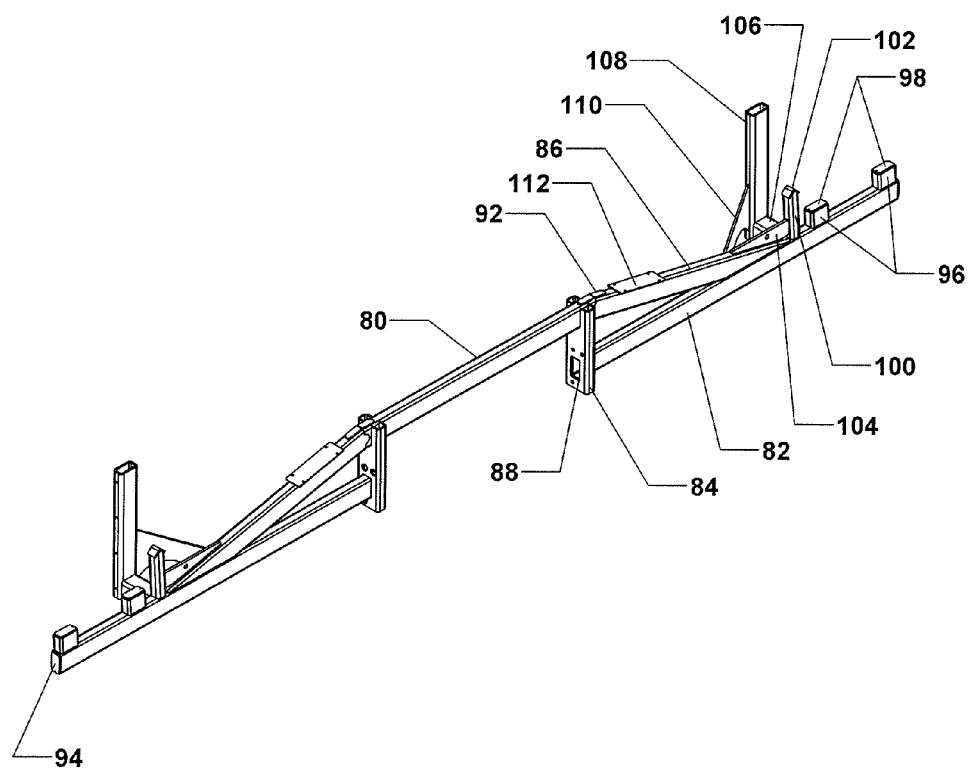
FIG. 6 is a rear perspective view of the transport rack of FIG. 5.

Referring to FIG. 5, the transport rack 56 of the invention captures the rear structure of the carriage frame 70 and is shown to bolt to outside vertical side plates 74. The transport rack 56 is primarily a symmetric tubular framework arranged in a manner that spans beyond the width of the carriage assembly frame to support the toolbar 46 in the rearward folded transport position shown in FIG. 3. Because the transport rack 56, shown in FIG. 6, is a symmetric framework, components of one side can be described in detail with components of the other side understood to be an opposed or mirror image of what is described. A single generally horizontal top tube 80 is joined on each end to a horizontal side extension tube 82 by a generally vertical tube member 84 and an angular brace member 86. The top of the vertical tube member 84 is notched out to allow the horizontal top tube member 80 to recess into it and a rectangular hole is cut through two faces near the bottom of the vertical tube member 84 at 88 to allow the horizontal side member to pass through. Mounting holes in member 84 enable bolting of transport rack 56 to the carriage assembly 70. Angular brace member 86 is secured to one end of member 80 and the connection is reinforced by a formed laminate plate 92. The outside end of the angular member 86 is joined to the member 82 to help support any resultant generally vertical load applied to the outer ends of member 82. An end cap 94 may be attached to member 82.

Two standoff tube members 96 are mounted to the outer ends of the member 82 at slight angle and spaced apart so as to coincide with the tubular members of a main wing of a toolbar stored in the transport position as will be described. Standoff members 96 are both capped with end cap plates 98. A transport peg 100 with a formed cap 102 is fixed to the upper face of member 82 just inside the inner standoff tube 96. A gusset plate 104 braced between the transport peg 100 and the angular member 86 provides additional lateral strength to the transport peg 100. A square spacer tube 106 is provided to support a vertical wing stop tube 108. A profiled gusset 110 provides lateral support to the wing stop tube 108. Implement lighting mounting plates are provided as at 112.

Figure 31:
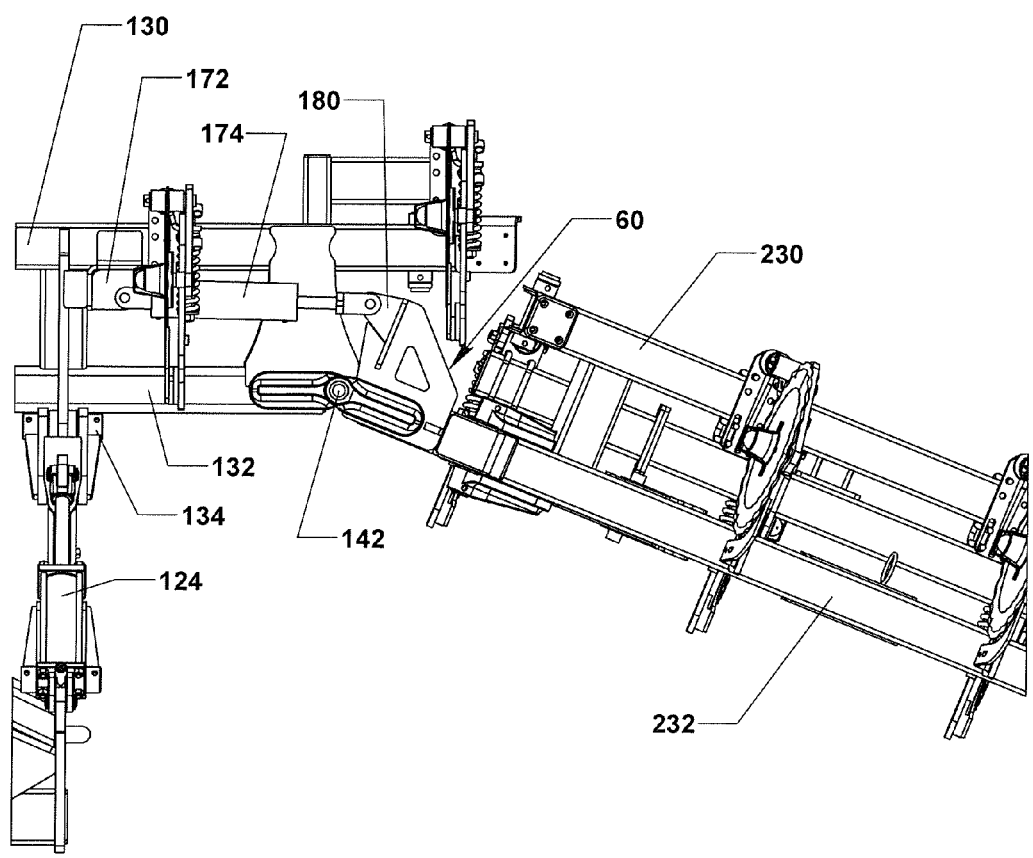
FIG. 31 is a bottom view of a main wing and center section connection with the main wing partially folded.

Referring to FIG. 2, the four primary components that make up the supporting structure of the invention's toolbar assembly 46 are the center section 64, the flex hinges 60, the main wings 66, and the outer flip wings 68. The center section 64 of the toolbar assembly serves as the base platform flanked by the flex hinges 60 and wing assemblies that are symmetrically suspended from the ends. In FIGS. 1 and 2, the center section 64 shown is pivotally secured to the sides of the trailer carriage frame 70 through parallel link arrangements consisting of upper parallel link assemblies 120, lower parallel link assemblies 122, and main lift cylinders 124. As seen in FIG. 31, each main lift cylinder 124 is operatively attached to the trailer carriage frame 70 and each lower parallel link 122 to raise and lower the toolbar assembly 46. In the field or deployed position, the center section 64 is the primary portion of the toolbar assembly that is connected to the trailer carriage frame 70, by the parallel link assemblies, through which all the resultant forces of the toolbar assembly 46 are transferred back into the carriage frame 70.

Figure 7:
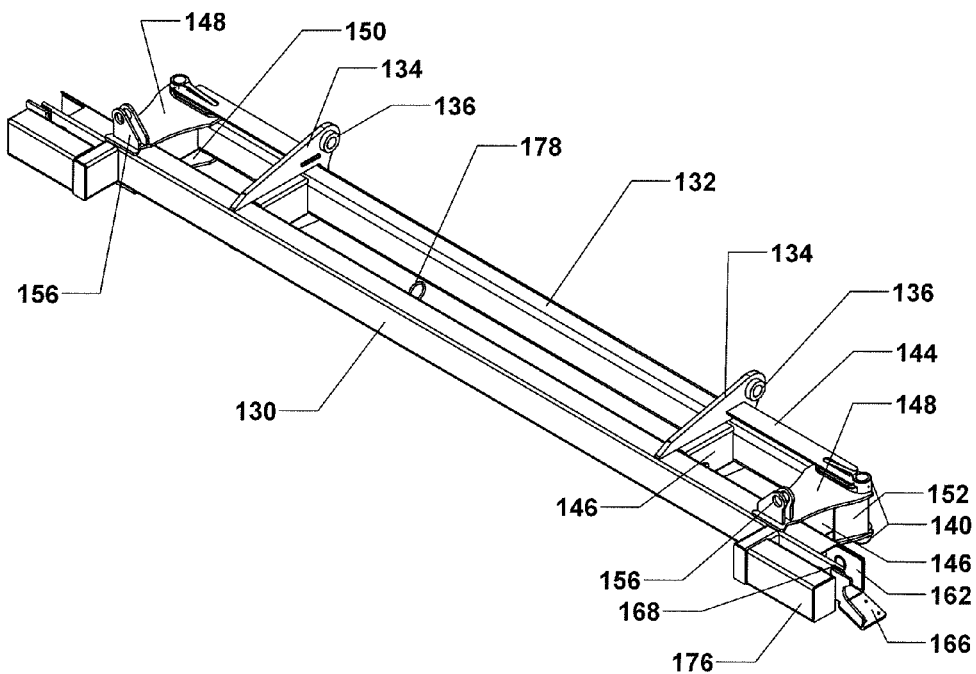
FIG. 7 is a rear perspective view of a center toolbar section in accordance with the invention.
Figure 8:
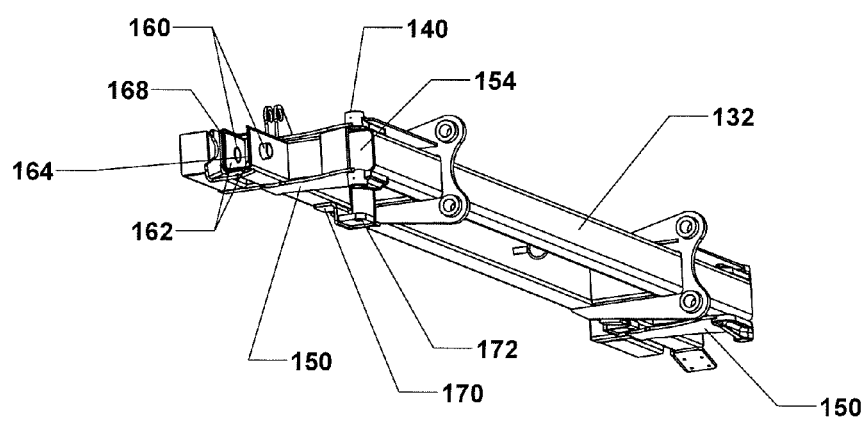
FIG. 8 is a partial front perspective view of the center toolbar section of FIG. 7 illustrating the underside components not visible in FIG. 7.

In FIGS. 7 and 8, the rigid framework of the center section 64 is shown enlarged and consists of a front rectangular tube 130 and rear rectangular tube 132 that runs transversely to parallel link mounts 134. Because of the symmetry of the center section 64 about the middle of the front rectangular tube 130 and rear rectangular tube 132, only the components of the center section 64 on one side, will be described in detail, it being understood that the opposite end components are an opposed or mirror image of what is described. DOM round tubing 136 is centered through holes in the parallel link mounts 134 to provide a sufficient bearing surface for pins securing the center section 64 to the parallel links. The front rectangular tube 130 and rear rectangular tube 132 run in spaced parallel relation to each other and are the primary center section support members through which the loads from the outer wings are conveyed to the parallel links and ultimately to the trailer carriage frame 70 of FIG. 1. These two parallel members also provide a structure to which soil incorporation tools such as rolling coulters can be clamped.

Figure 9:
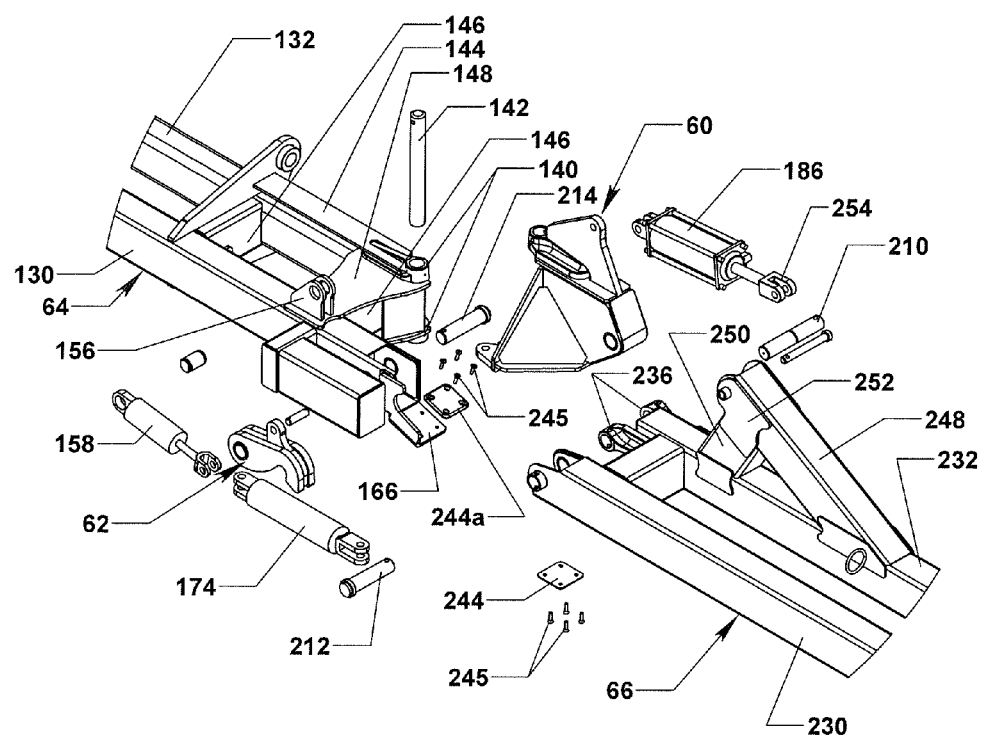
FIG. 9 is an exploded fragmentary perspective view of left side components of the toolbar between the outer end of the center section and inner end of a main wing section.

The top side of the outer end of the front rectangular tube 130 is profiled to accommodate generally vertically pivoting latch member 62, shown in FIG. 9, that secures the front of a main wing 66 to the front rectangular tube 130 when the main wing 66 is in the deployed field position. As shown in FIGS. 7 and 8, a side folding arrangement includes hinge mounts or hinge castings 140 with grease zerk provisions located at the top and bottom faces at the outer ends of the rear rectangular tube 132. As seen in FIG. 9, hinge castings 140 capture main wing hinge pins 142 and allow them to pivot about a vertical axis to enable side folding of the main wings 66 by means of the adjoining flex hinges 60.

During the side folding and unfolding process of the main wings 66, the top and bottom hinge castings 140 must transfer the moment couple of the gravitational load on the main wings 66 and outer flip wing 68 onto the ends of the center section 64. Hinge straps 144 (FIGS. 7 and 8) secured to the hinge castings 140 strengthen the hinge castings and assist in transferring the tension stress from the moment couple directly into the parallel link mounts 134 thereby reducing stresses that would otherwise be transmitted through the hinge casting 140 and into the rear rectangular tube 132 during the folding operation.

Cross brace tubes 146 are centered between the front rectangular tube member 130 and the rear rectangular tube member 132 near the outer end of the center section 64 as well as within the parallel link mount 134 to provide rigidity throughout to the center section. Top and bottom reinforcement plates 148 and 150, respectively, are laminated over the outer cross braces 146 and front and rear rectangular tube members 130 and 132 to enhance stability and adhesion between the adjoining members and strengthen the wall surfaces. A further brace plate 152 is secured between the top and bottom reinforcement plates to tie the components together and help stabilize the outer edges of the hinge castings 140. The openings on the ends of the rear rectangular tube 132 may be closed as by rectangular end cap plates 154.

Figure 27:
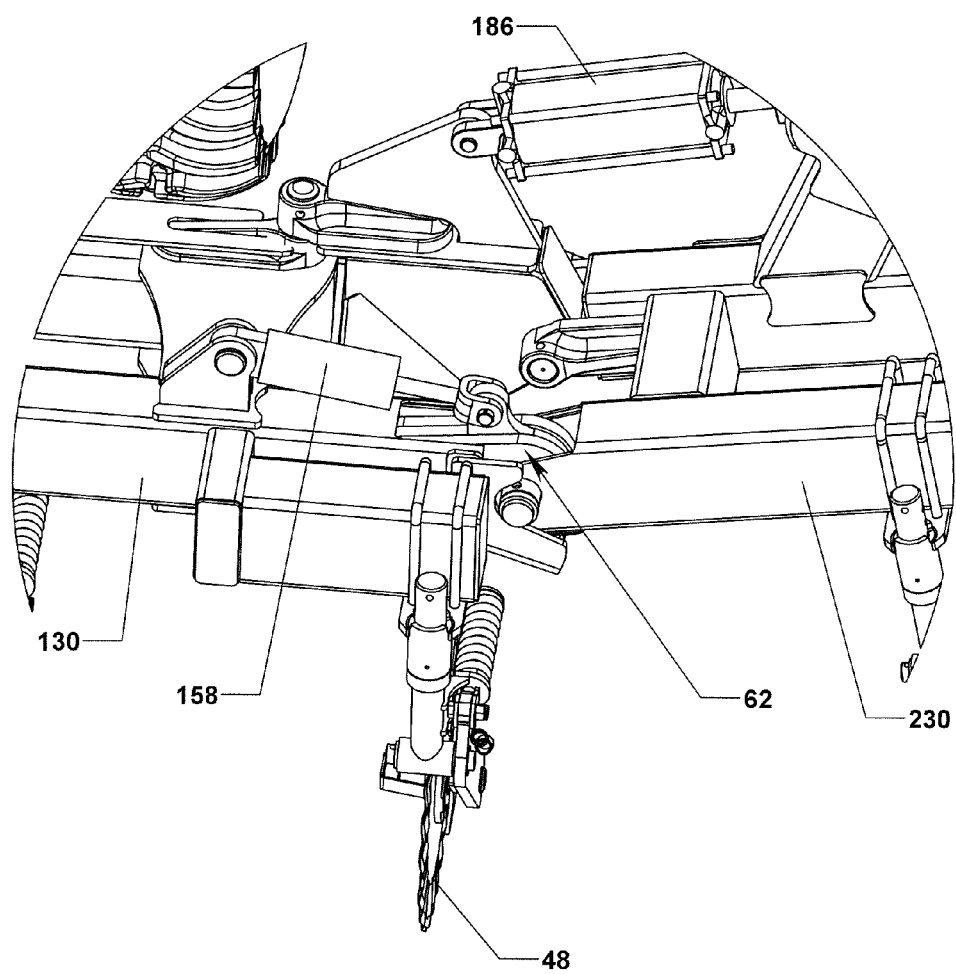
FIG. 27 is an enlarged perspective view of the flex hinge and latch area of the toolbar in the aligned field position.

A pair of spaced latch cylinder lugs 156 with concentric holes provide a mount for a latch cylinder 158 (FIG. 9) on the top face of each top reinforcement plate 148 (FIG. 7). The concentric holes of the latch cylinder lugs 156 are positioned at a horizontal and vertical distance relative to the center axis of concentric latch bushings 160 fixed near the outer end of the front rectangular tube 130. Latch laminate plates 162 are added to the outer ends of the front inside vertical faces of member 130 to strengthen the vertical wall of member 130 opposing the lateral force that is applied to the latch bushings 160 during field operation. An inner rectangular end cap plate 164 is recessed into the outer end of the front rectangular tube member 130. A formed receiver ramp 166 designed to help position each main wing 66 relative to the latch 62 in the deployed field position shown in FIG. 27, is fixed to the front and lower faces at each outer end of the front rectangular tube 130 as shown in FIGS. 7 and 8. To provide clearance for the main wing 66 to side fold properly into deployed field position, a spacer plate 168 is positioned between the front face of the front rectangular tube 130 and the inside face of the formed receiver ramp 166.

A more comprehensive understanding of the purpose of receiver ramp 166 and spacer plate 168 will become more apparent as the folding operation is described in further detail hereinafter. Secured below the front rectangular tube 130 and attached to the inner cross tube 146 and parallel link mount 134 is a formed cylinder lug mounting plate 170. The main fold cylinder lug 172 attached to the formed cylinder lug mounting plate 170 pivotally anchors the blind end of the main fold cylinder 174 shown in FIG. 9 about a vertical axis for side folding the main wing 66. A small flat plate ties the vertical leg of the formed cylinder lug mounting plate 170 to the bottom face of the parallel link mount 134 to withstand the resultant forces incurred by the main fold hydraulic cylinder 174 shown in FIG. 9.

It is recognized that some crop spacing and application practices require an incorporation tool to be laterally placed at an interval coinciding with the pivoting latch mechanism or main wing hinge area. To accommodate this possibility a toolbar offset assembly 176, shown in FIGS. 7 and 8, is attached to each end of the forward face of the center section member 130 protruding forward just below the latch cylinder lugs 158 and extending outwardly around the latch bushings 160, spacer plate 168 and receiver ramp 166.

Other features such as hose rings 178, for securing hoses, and hardware mounts may be present on the center section 64 but these are not pertinent to the present invention.

Figure 26:
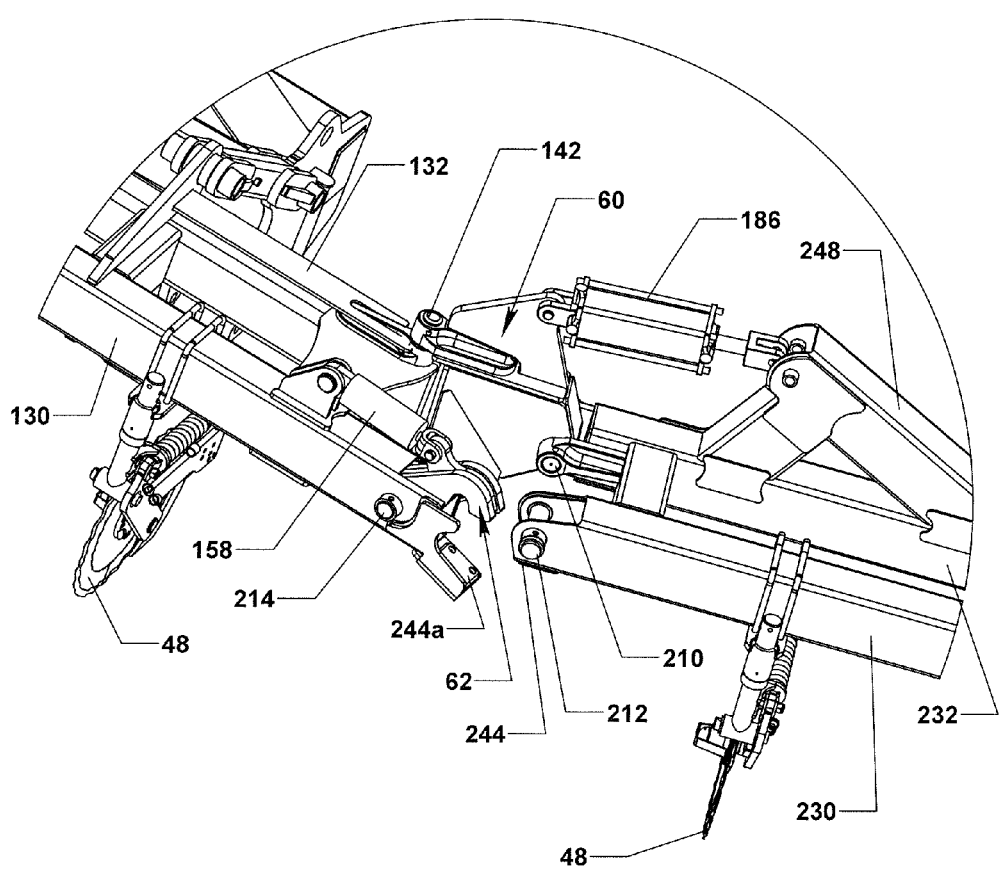
FIG. 26 is an enlarged perspective view of a detail of the flex hinge and latch area of the toolbar in a disposition approaching field position.

Referring to the exploded view of FIG. 9, and FIGS. 26 and 27, a flex hinge assembly 60 is adapted to be pivotally secured about a vertical axis at each end of the rear rectangular tube 132 using a flex hinge pin as at 142. Each flex hinge assembly is pivoted generally horizontally about its hinge pin by an operating device which may be a hydraulic cylinder as at 174 shown operatively attached between main fold cylinder lug 172, of the center section, and flex hinge side fold cylinder lug 180, shown best in the enlarged details of FIG. 31. This provides the force to pivot each flex hinge member 60 about the flex hinge pin 142 thereby folding and unfolding the main wings 66.

In addition, each flex hinge member 60, in conjunction with the latch assembly as described hereinafter in more detail, is a primary component of the invention as it enables a main wing 66 not only to rotate generally horizontally about a vertical axis for side folding but also enables the corresponding main wing to pivot or rotate generally vertically about a horizontal axis perpendicular to the swath width for ground following and lift assist characteristics as will be described.

Figure 10:
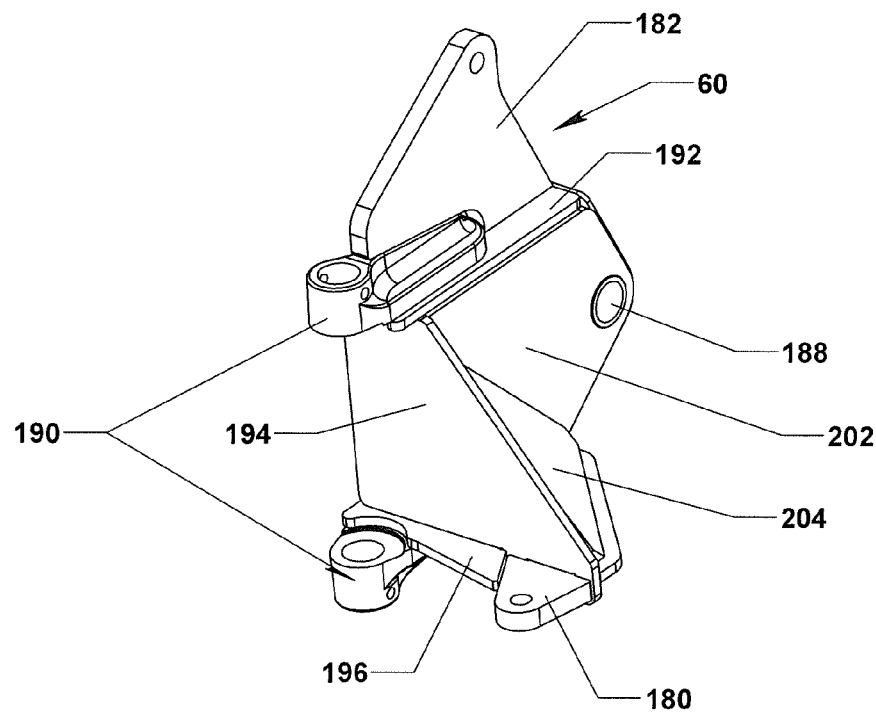
FIG. 10 is a perspective view of a toolbar flex hinge detail.
Figure 11:
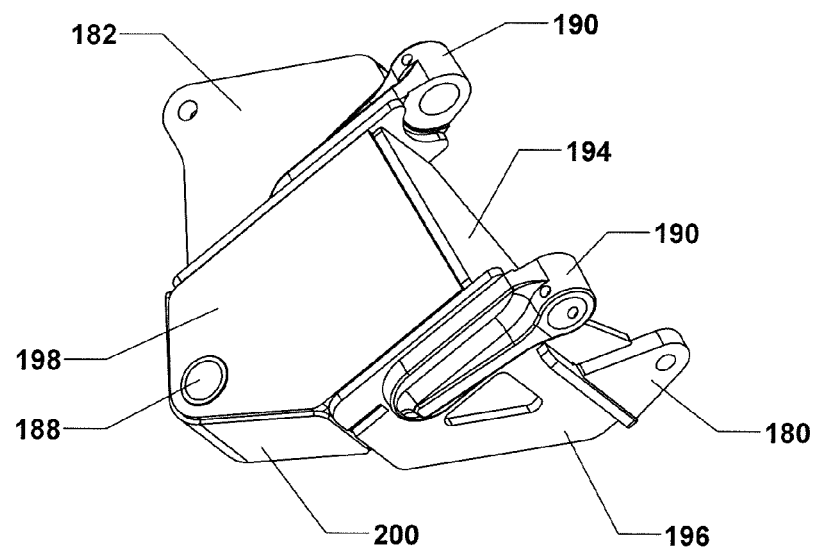
FIG. 11 is a perspective view of the toolbar flex hinge detail of FIG. 10 illustrating the underside components not visible in FIG. 10.

A flex hinge 60 is shown in detail in FIGS. 10 and 11. The hinge includes a down pressure lug plate 182 which is a core component of the flex hinge assembly 60 that ties many of the other component in the flex hinge assembly 60 together. The down pressure lug plate 182 is a profiled plate that has a hole 184 near the top for mounting one end of an actuator which may be a hydraulic down pressure cylinder 186, shown in FIG. 9, and extends through the flex hinge 60 to capture flex hinge bushing at 188 which enables generally vertical pivoting of a corresponding main wing as will be described. The thickness mid plane of the down pressure lug plate 182 coincides with the center axis of the concentric holes in the flex hinge upper and lower hinge mounts or hinge castings 190 as well as the width mid plane of the flex hinge bushing 188. An upper casting mounting plate 192 is secured to the down pressure lug plate 182 and supports the lower face of the upper casting 190.

Referring to FIGS. 9 and 10, further details of the flex hinge assembly will be described. The top rib of the upper casting is joined to the adjacent down pressure lug plate 182 to reinforce the upper casting 190 and transfer a majority of the resultant force from the down pressure cylinder 186 attached to the down pressure lug 182 directly into the side fold hinge at the location between the upper and lower castings 190. A cylinder lug mounting plate 194 separates the upper and lower hinge castings 190 and secures the side fold cylinder lug 180 in a horizontal plane at the desired distance from the centers of the hinge castings 190. A lower casting mounting plate 196 is used to stabilize the side fold cylinder lug 180 in the horizontal direction and secures the lower hinge casting 190. A shaped side plate member 198 is fixed to the outer edge of the cylinder lug mounting plate 194, the upper casting mounting plate 192, the lower casting mounting plate 196, the flex hinge bushing 188, and an end cap 200 to stabilize outer edge of the upper casting and lower castings 190 and the flex hinge bushing 188. A further side plate member 202 is secured to the inner vertical face of the cylinder lug mounting plate 194, the top face of the lower casting mounting plate 196, the inner edge of the upper casting mounting plate 192, the inner edge of the flex hinge bushing 188, and the inner edge of the end cap 200 to help stabilize the inner edge of the upper and lower castings 190 and the flex hinge bushing 188.

The end cap 200 facilitates the distribution of the stresses introduced into the adjoining spaced side plates 198 and 202 from the resultant forces applied to the flex hinge bushing 188. A further gusset plate 204 angularly secured to the cylinder lug mounting plate 194, the lower casting mounting plate 196, and the side plate member 202 facilitates the distribution of the stresses introduced into the lower casting mounting plate 196 and the cylinder lug mounting plate 194 from the hydraulic cylinder pivotally attached to the side fold cylinder lug 180.

As shown in the fractional exploded view of FIG. 9, a latching system assembly is positioned in parallel to the flex hinge 60 and used to mechanically secure each main wing 66 in the field position while still allowing the main wing 66 to rotate or pivot freely in a generally vertical direction about the concentrically aligned main wing hinge pin 210 and main wing latch pin 212 to enable each main wing to have ground following and lift assist characteristics. An actuator in the form of latch cylinder 158 is operatively connected to each outer end of the center section 64 and a latch assembly 62 to rotate the assembly about a center section latch pin 214 to capture the main wing latch pin 212 as shown in FIG. 27.

Figure 12:
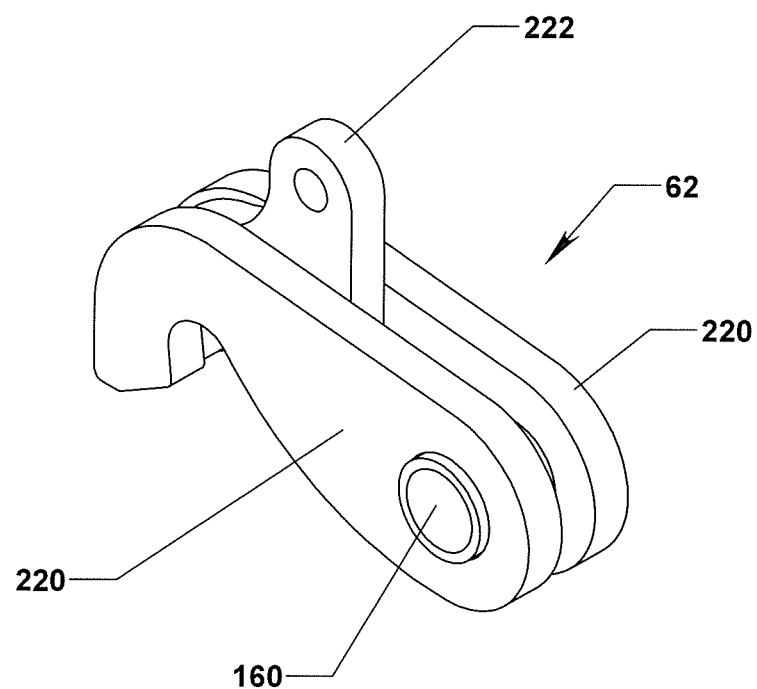
FIG. 12 is an enlarged perspective view of a toolbar latch assembly detail.

The latch assembly 62, shown in FIG. 12, consists of two outside latch plates 220 spaced apart and strengthened by a latch lug plate 222. Latch bushing 160 with provisions for a grease zerk is centered between the two outside latch plates to maintain consistent spacing and provide additional wear surface around the main wing latch pin 212.

Further with respect to the generally vertical pivoting of main wings 66, as shown in FIGS. 9 and 27, each main wing assembly 66 is adapted to be pivotally secured about a generally horizontal axis to the flex hinge 60 by main wing hinge pin 210. A hydraulic or other down pressure cylinder 186 is designed to be operatively connected between the flex hinge 60 and the main wing 66 to operate to pivot the main wing 66 about the main wing hinge pin 210.

As shown in FIGS. 13 and 14, each main wing assembly 66 includes a front tube member 230 and a rear tube member 232 separated and spanned by a cross tube 234. Main wing hinge mounts or hinge castings 236 with the holes concentrically aligned are fixed to the front and back face of member 232. A shim plate may be is positioned between the inner faces of the main wing hinge castings 236 and the front and back faces of the main wing rear tube 232 to provide accurate spacing between the main wing hinge castings 236 to capture the flex hinge assembly 60 (FIG. 9). A rectangular end cap plate 238 is located at the inner end of each tube member 232 to strengthen the tube member 232 against stresses that may propagate through hinge castings 236.

Hinge bushings 240 with thru holes at each end are concentrically aligned with the holes in the hinge castings 236 and positioned through the outside and inside vertical faces of the front tube 230. The inner end of each tube member 230 is recessed to accommodate the hook end of the latch assembly 62 (FIG. 9) which pivotally secures the front tube member 230 about an axis central to the hinge bushings 240 and hinge castings 236. A four hole pattern 242 is placed in the bottom wall at the inner end of each main wing tube member 230 to accommodate connection of a stainless steel wear plate 244, shown in FIG. 9, that will be described hereinafter.

Referring again to FIGS. 13 and 14, and the parts of the main wings, a laminate plate is added as at 246 to strengthen the portion of each front tube member 230 that bears lateral force applied to the hinge bushings 240 in the lengthwise direction of the tube when the latch 62 has secured the main wing latch pin 212 in the deployed field position.

A down pressure tube 248 with a profiled end including a hole in each vertical face is placed angularly onto the inner end of each rear tube 232. The down pressure tube 248 is the primary component for transferring the resultant forces of down pressure cylinder 186 into the main wing 66. Down pressure tube 248 is supported at its outer end by a further support tube 250 fixed perpendicular to the bottom face of tube 248 angularly to the rear tube 232. Cylinder bushings are fixed concentrically to the holes in the down pressure tube 248 on both vertical faces, spaced apart an appropriate distance to accommodate clevis 254, attached to the rod of down pressure cylinder 186 (FIG. 9). The outer front and back vertical walls of the down pressure tube 248 are reinforced with laminate plates 252 to supplement the bearing strength of the tube walls and strengthen the fusion of the support tube 250 to tube member 248. An end cap 256 provides the outer end of the down pressure tubes 248 to add strength and seal the open end from the environment. Further laminate support plates 258 may be added to supplement the connection between the front and rear face of the support tube member 250 and the respective faces of the rear tubes 232. Pressure plates 260 are welded to the both the front and back faces of the down pressure tube member 248 and the respective faces of the rear tube member 232 to reinforce the connection of the down pressure tube member 248 to the rear tube member 232.

Figure 28:
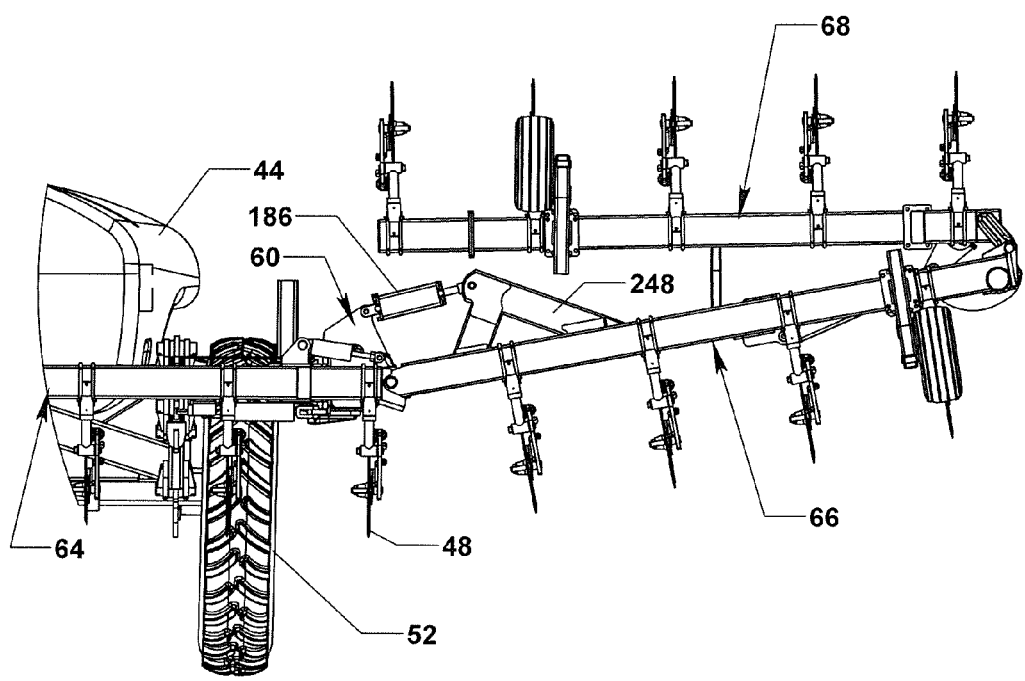
FIG. 28 is a front elevation view of one side of a chemical applicator with the main wing section of the toolbar fully raised and the flip wing section stored in a folded transport position.
Figure 29:
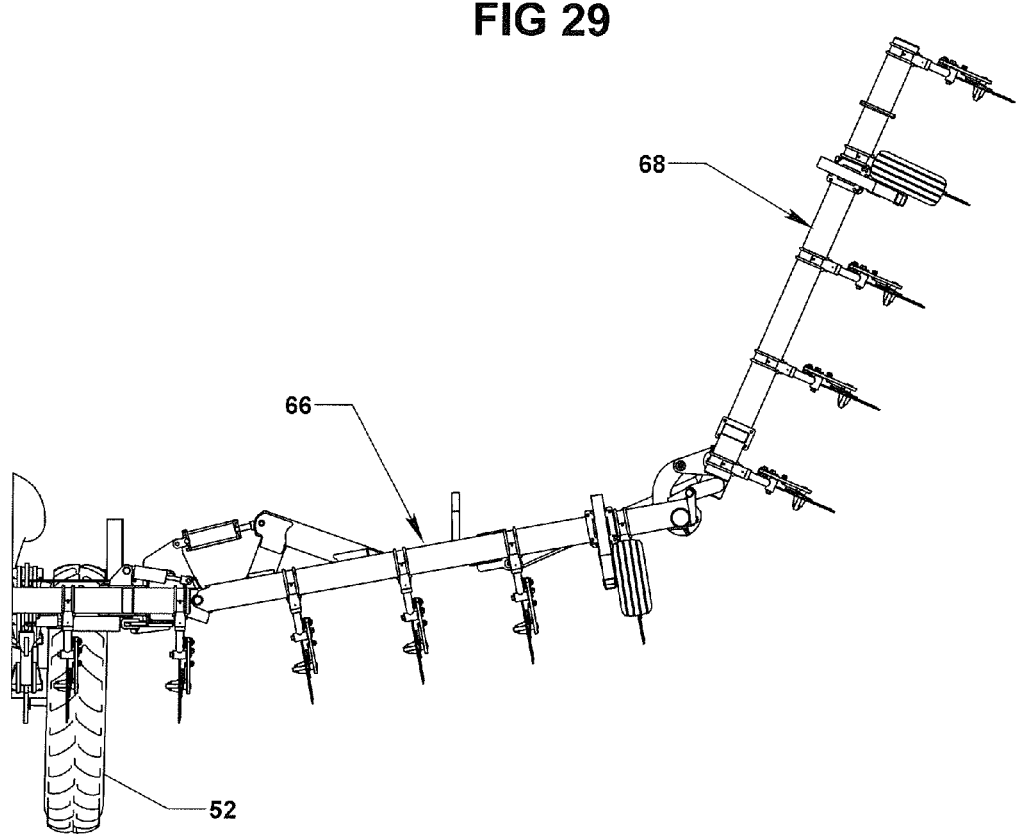
FIG. 29 is a front elevation view of the left side of the chemical applicator as in FIG. 28 with the toolbar flip wing section partially folded.

Flip wing rest tube shapes 262 are fixed angularly to the top of the main wing rear tube members 232 and the main wing front tube members 230. A rest tube 262 supports a corresponding flip wing 68 when the wing is stored in the transport position as illustrated in FIG. 28.

A formed support cross plate 264 near the middle of the main wing 66 maintains the gap between each front tube member 230 and rear tube member 232 and provides a primary platform to secure the flip wing cylinder lug plate 266. Lower cross plates 268 tie the bottom of the formed support cross plate 264 and the flip wing cylinder lug plate 266 to the lower faces of the front tube members 230 and rear tube members 232. Inner hinge mounts or hinge castings 270 are fixed about the outer top and end faces of the rear tube members 232 and front tube members 230 to pivotally secure the flip wing 68 (FIG. 2). The vertical faces on the outer ends of both the front tube members 230 and the rear tube members 232 are coped away and a round cross tube 272 is positioned through the holes to maintain the gap between tubes 230 and tubes 232 and to also provide the bearing surface for the flip wing linkage assembly (FIGS. 18 & 19) detailed hereinafter. Round end cap plates 280 are placed over both ends of the round cross tube 272 to seal the opening from the environment. Small gusset plates 274 fixed to the round cross tube 272 and the inside vertical faces of both the front tube 230 and the rear tube 232 prevent the flip wing linkage assembly (FIGS. 18 & 19) from translating along the round cross tube 272. Formed laminate plates 276 are placed under the round cross tube 272 and centered on the bottom face of the rear tube 232 and the front tube 230 to re-establish tube wall material that was removed and join the lower face of inner hinge castings 270 to the round cross tube 272 and tubes 230 and 232. A formed transport lock plate 278 is fixed to the outer rear face of the rear tube 232 as well as the outer face of main wing inner hinge casting 270 to capture the transport peg 100 shown on the transport rack in FIG. 6 when the main wing 66 is in the transport position shown in FIG. 3.

Figure 15:
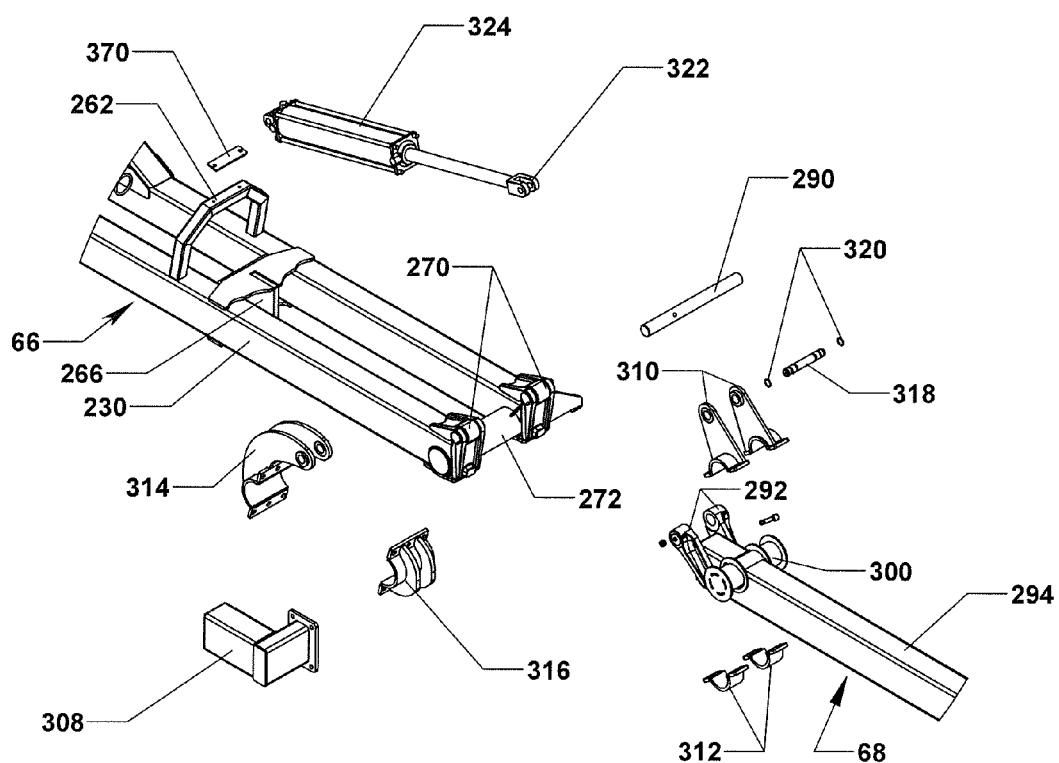
FIG. 15 is an exploded perspective view of components of a toolbar located between the outer end of the main wing section and inner end of a flip or outer wing section.

The exploded perspective view of FIG. 15 shows the connection between a main wing 66 and a flip wing 68. The flip wing 68 is pivotally joined between the main wing inner hinge castings 270 on the outer end of each main wing 66 by a flip wing pin 290 spanning through the centers of both main wing inner hinge castings 270 and flip wing hinge mount or hinge castings 292. Flip wing hinge pin 290 from horizontal translation and rotationally joins the main wing 66 to the outer flip wing 68.

The inner portion of each wing 68 are illustrated in the details of FIGS. 16 and 17, spaced hinge castings 292 are fixed to the generally vertical faces of the flip wing main tube 294 so as to fit between the main wing inner hinge castings 270 on hinge pair 292 as shown in FIG. 15. As shown in FIGS. 16 and 17, tube 294 is provided with an end cap at 296 and an extension cover plate 298 on the outer or free end which also provides a mounting surface to attach a flip wing extension assembly as at 69 shown in FIG. 2. A linkage tube 300 is recessed into the upper portion of the flip wing tube 294 near the hinge castings 292 to provide bearing surfaces for a flip wing linkage assembly. Round inner stop plates 302 and outer end caps 304 minimize axial translation of the flip wing linkage assembly 306 shown in FIGS. 18 and 19.

In some application embodiments it may be necessary to have a incorporation tool located near the flip wing hinge or the flip wing linkage area. For this toolbar configuration an exemplary bolt-on offset as at 308 consisting of a tubular frame and plate assembly is fastened to the flip wing 68 as shown in FIG. 18.

Figure 18:
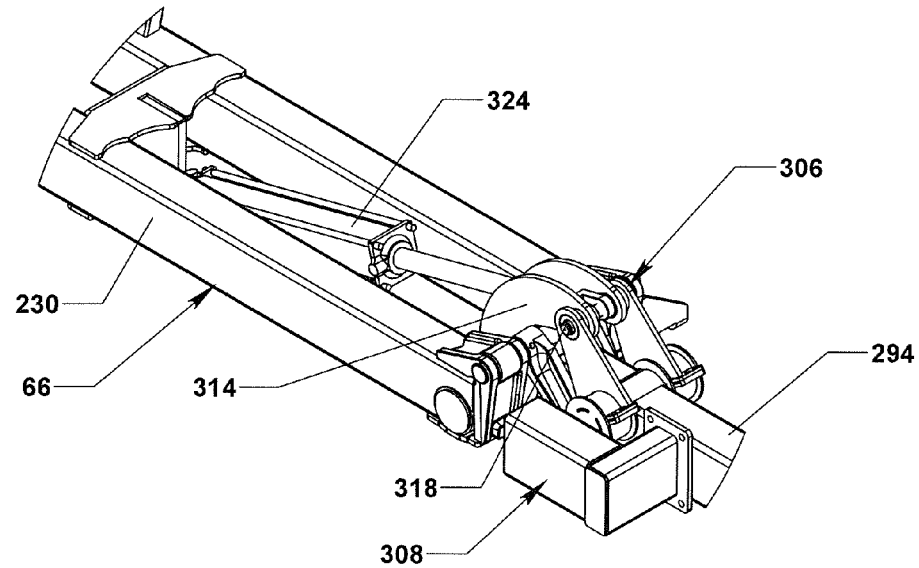
FIG. 18 is an enlarged detailed perspective view of an outer or flip wing hinge and linkage area.
Figure 19:
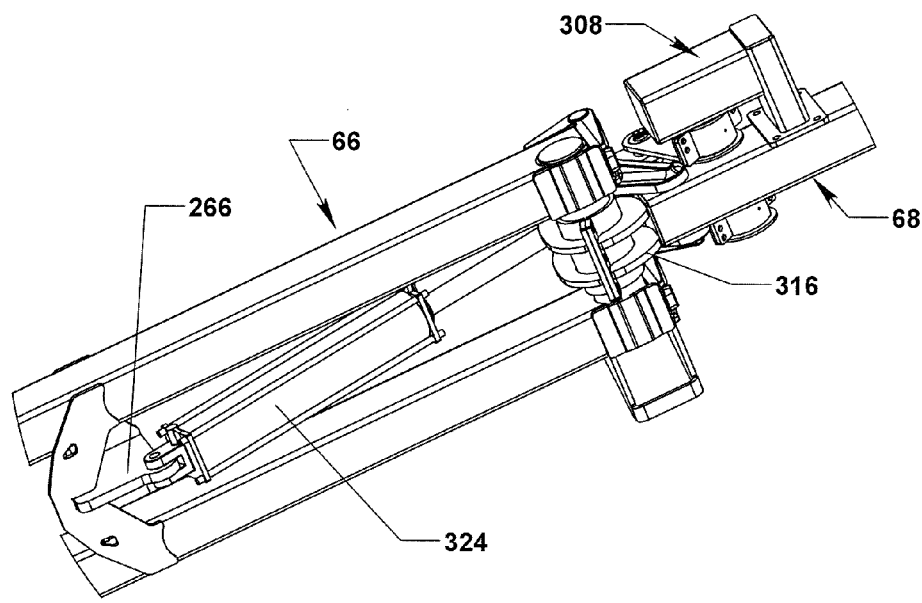
FIG. 19 is a detailed perspective view of the outer or flip wing hinge and linkage area of FIG. 18 illustrating the underside components not visible in FIG. 18.

As shown in FIGS. 15, 18 and 19, parts of each flip wing linkage assembly 306 include two flip wing link members 310, two lower clamps 312, a main wing link member 314, a main wing clamp 316, a linkage pin 318, and two external pin retaining rings 320. The two flip link members 310 are pivotally clamped about each end of the linkage tube 300 using lower clamps 312 in a manner that allows free rotation with lubrication around the linkage tube 300. The main wing link member 314 likewise is pivotally clamped about the center of the round cross tube 272 by the main wing clamp 316 in a manner that allows free rotation with lubrication on the surface of round cross tube 272. The main wing link member 314 and the flip wing link members 310 are pivotally secured to the rod end clevis 322 of a flip wing hydraulic cylinder 324 attached to main wing linkage member 314 by linkage pin 318. External retaining rings 320 retain flip wing linkage pins 318 in place while allowing them to rotate freely in place.

Each flip wing linkage assembly 306 in combination with the flip wing hydraulic cylinder 324 (operatively connected to the flip wing cylinder lug plate 266 on the main wing) is used to fold the flip wing assembly 68 approximately 170 degrees from the deployed field position to the transport position where it rests on corresponding main wing 66, or conversely.

Figure 20:
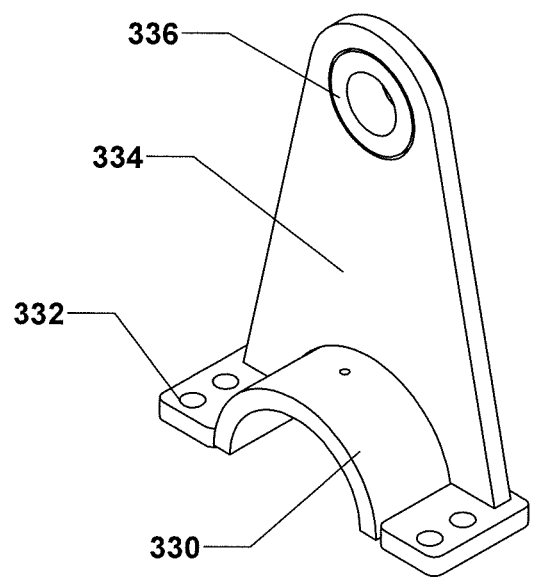
FIG. 20 is a perspective view of a flip wing linkage component.
Figure 21:
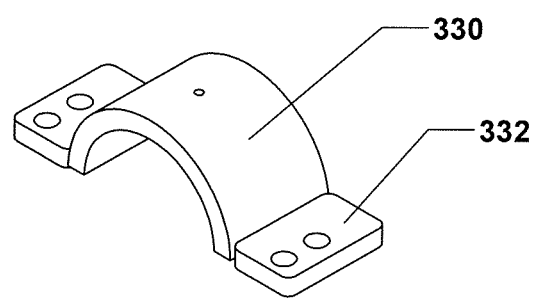
FIG. 21 is a perspective view of an outer wing lower clamp component.

Referring to the detail in FIG. 20, each flip wing link member 310 may include a heavy wall DOM tube 330 sectioned approximately in half and flanked by mounting plates 332. Provision is made to grease the inner face as the rotational bearing surface for the flip wing link member 310. A triangular profiled plate 334 with a through hole 336 to secure a cylinder bushing 336 is also joined to member 330. Lower clamps 312 shown in FIG. 21 has a similar configuration but without member 334.

Figure 22:
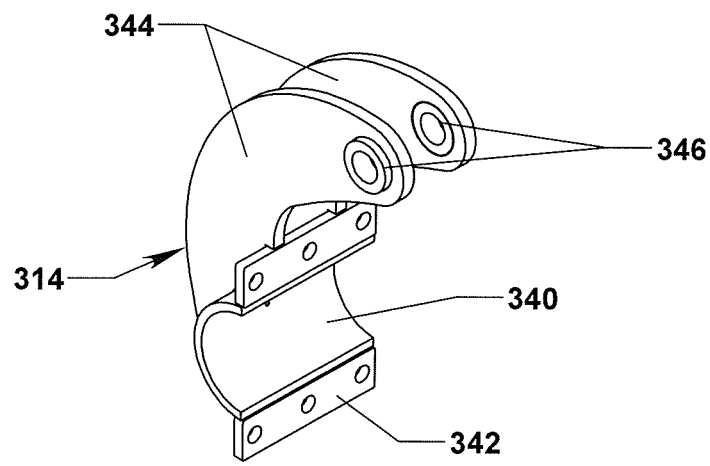
FIG. 22 is a perspective view of a main wing section linkage component.

In the perspective view of FIG. 22, each main wing link assembly 314 includes a heavy wall DOM tube segment 340 sectioned approximately in half and flanked by mounting plate 342. Grease provisions are made for the bearing surface of member 340. Two spaced semi-circular profiled plates 344 with through holes provided with cylindrical bushings 346 are centrally spaced along tube 340.

Figure 23:
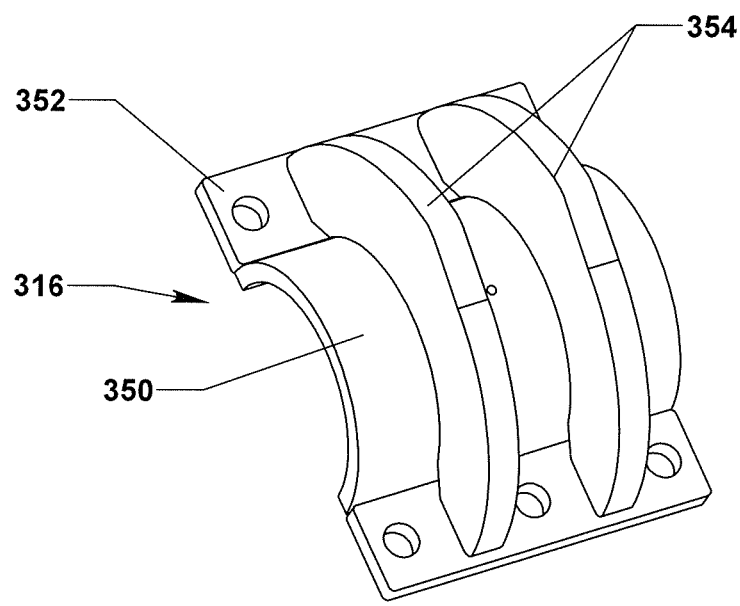
FIG. 23 is a perspective view of a main wing section clamp component.
Figure 30:
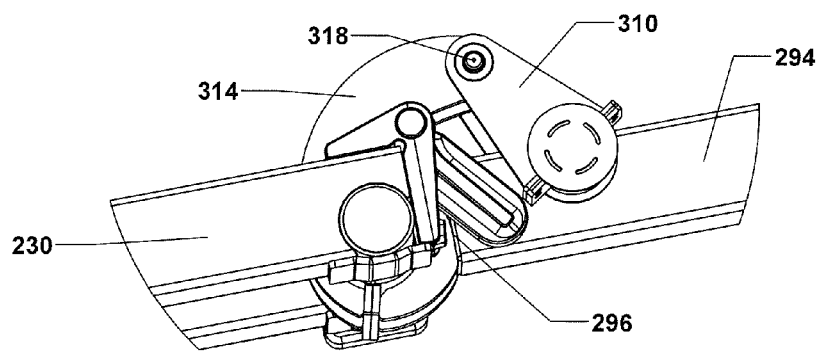
FIG. 30 is an enlarged fragmentary perspective view of the flip wing linkage.

Main wing clamp detail of FIG. 23 includes heavy wall DOM tube segment 350. Mounting plates 352 in the same configuration as the main wing linkage 314 (FIG. 22). Two semi-circular profile plates 354 are centrally spaced about the heavy wall DOM tube segment 350 and the three hole mounting plates 352. The semi circular profile plates 354 have a flat surface on the outer radius to serve as a mechanical stop for the flip wing assembly 68 as illustrated in FIG. 30.

Figure 3:
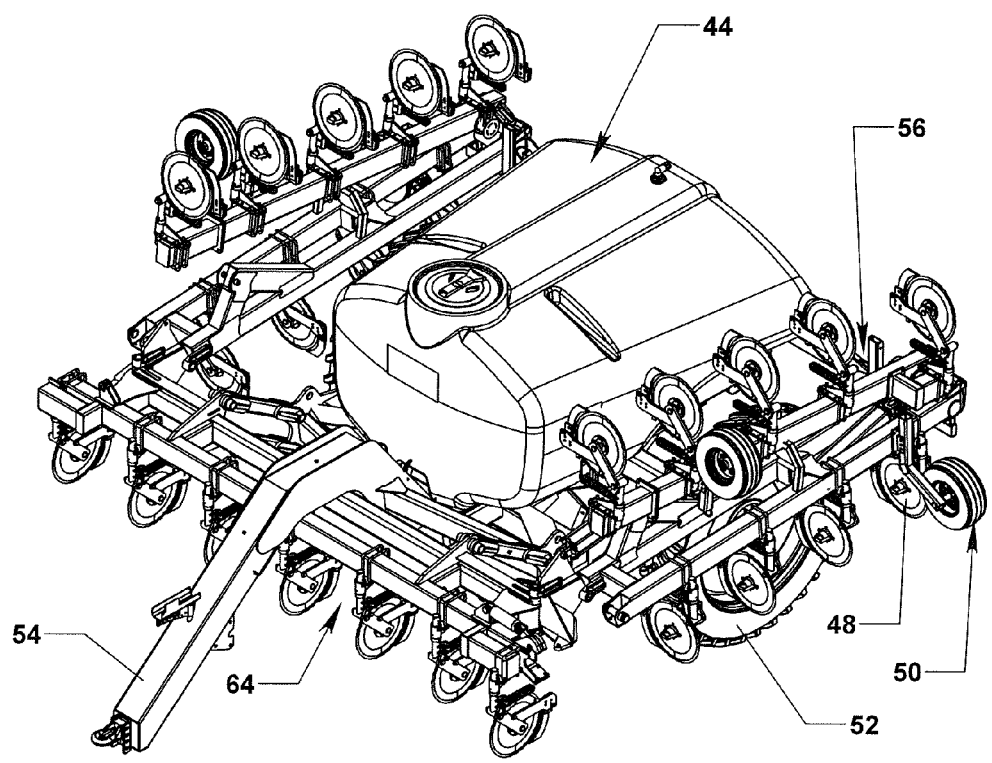
FIG. 3 is an enlarged perspective view of the side-folding chemical applicator of FIG. 1 with the toolbar folded in a transport position.
Figure 24:
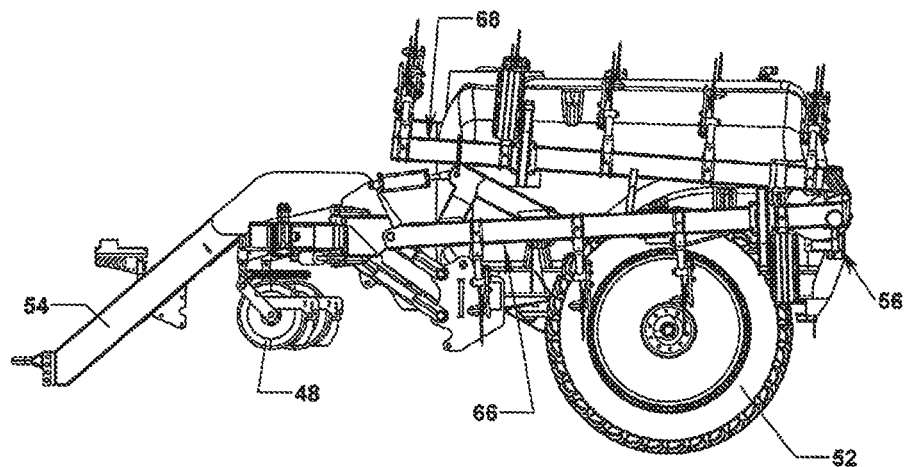
FIG. 24 is a side view of a side folding chemical applicator illustrating the motion of a main wing section for saddling and unsaddling to and from the secured transport position.
Figure 25:
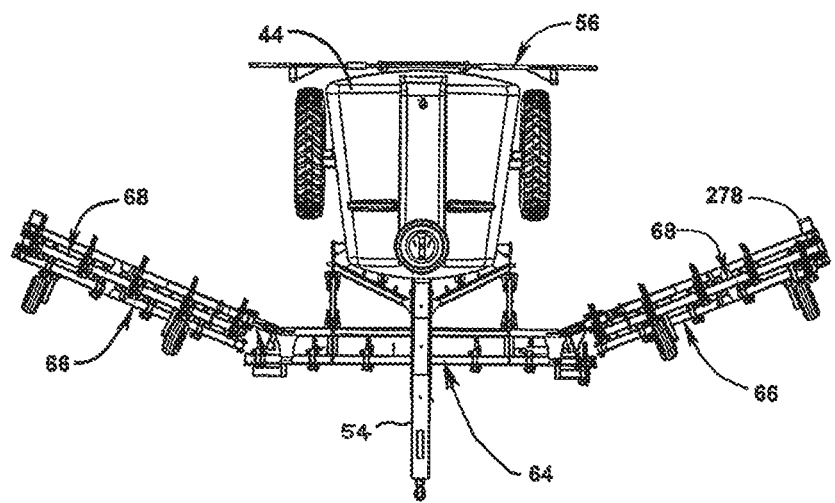
FIG. 25 is a top view of a folding chemical applicator illustrating the motion of main wing section for side folding to and from the transport position.

The normal method of operating a side fold fertilizer applicator, or the like, in accordance with the invention will be described and illustrated for one side of the applicator, it being understood that the other side of the toolbar operates in an identical opposed manner. Starting in the transport position, as shown in FIGS. 3 and 24, the main wings 66 are lifted vertically from the transport rack 56 by retracting the rod end of the down pressure cylinder 186 so that the formed transport lock plate 278 in FIG. 25 on the main wing 66 raises above the transport peg 100 on the transport rack assembly 56 shown in FIG. 24. To rotate the main wings 66 forward as illustrated in FIGS. 25 and 31, the main fold hydraulic cylinder 174, pivotally connected the center section 64 and the flex hinge 60 is retracted causing the flex hinge 60 to rotate about the flex hinge pin 142.

The rotating cycle continues until the main wing 66 is parallel to the center section 64 where it is secured in the deployed field position by the latch assembly 62, the gravitational and torsion loads of the main wing 66 and outer flip wing 68 are transmitted entirely to the center section 64 through the flex hinge assembly 60. The gravitational loading is introduced to the flex hinge 60 by a combination of the down pressure cylinder 186 and the main wing hinge pin 142 shown in FIG. 9. Referring to FIGS. 9 and 25, all torsion loading from the main wing 66 and outer flip wing 68 during the folding process is transmitted to the flex hinge 60 through the main wing hinge pin 142. The resultant forces applied to the down pressure lug 182 and the flex hinge bushing 188 are transmitted into the center section 64 (FIG. 9) through the upper and lower castings 190 and the side fold cylinder lug 180 shown in the flex hinge illustration FIGS. 10 and 11.

As each main wing 66 is rotated forward, the main wing latch pin 212 (FIG. 26) approaches pivoting latch 62. For the pivoting latch 62 (shown in FIG. 9) to effectively engage the main wing latch pin 212 in the field position, the center axis of the main wing latch pin 212 must be aligned closely to the center axis of the main wing pin 210 at a consistent distance from the center section latch pin 214. It will be appreciated that the torsion on the flex hinge pin 142 and the main wing hinge pin 210 as a result of gravity acting on the components extending outward from the flex hinge 60 can cause flexure in the components that make up each main wing 66. This component flexure combined with the hole clearances necessary for rotation at the flex hinge pin 142 and the main wing hinge pin 210 may cause axial misalignment between the main wing latch pin 212 and the main wing hinge pin 210. To account for such an anticipated pin misalignment a stainless steel wear plate 244 shown in FIGS. 9 and 26 is secured with taper headed fasteners 245 to the underside of the main wing front tube 230 near the latch hinge. An identical stainless steel wear plate 244a is secured to the formed receiver ramp 166 on the center section 64 in the same manner.

When the rotation of flex hinge 60 approaches the field position in which the main wing front tube 230 nears a laterally aligned position with the center section front rectangular tube 130, stainless steel wear plate 244 contacts stainless steel wear plate 244a. Thus a resultant vertical force proportional to the incline of the formed receiver ramp 166 is applied to the inner end of the main wing front tube 230 as the inner end of the main wing front tube 230 continues to slide up the formed receiver ramp 166 until the main wing latch pin 212 is axially aligned with the main wing hinge pin 210.

Once each main wing fold hydraulic cylinder 174 (FIG. 31) is fully retracted and the main wing 66 is aligned with the center section 64, as shown in FIG. 27, the blind end of double acting latch cylinder 158 is pressurized to rotate the latch assembly 62 about the latch pin 214 (FIG. 26) to capture the main wing latch pin 212. With the main wing latch pin 212 axially aligned to the flex hinge pin 210 and secured by the latch assembly 62, the main wing 66 is mechanically restrained from pivoting horizontally about the main wing hinge pin 142. However, the main wing is still able to pivot vertically about main flex hinge pin 210 and main wing latch pin 212 to enable it to follow ground contour or for lift height assist during tuning maneuvers at row ends.

With the main wing 66 secured by a latch assembly 62, the toolbar assembly 46 may be used to incorporate chemical although said flip wing 68 is still in the folded transport position shown in FIG. 28 to match the swath width of planting equipment. When it is desired to rotate flip wings 68 into the deployed field position as shown in FIG. 18, the rod end of flip wing hydraulic cylinders 324 is extended applying a moment through the flip wing linkage assembly about the flip wing hinge until the flip wing tube 294 is rotated and vertically aligned with the main wing 66. FIG. 30 shows an enlarged flat profile of a main wing clamp system showing end cap 296 contacting and ensuring vertical alignment of flip wing tube 294 with main wing 66.

For chemical incorporation, the toolbar assembly 46 as shown in FIGS. 1 and 2 is lowered from the fully raised field position by releasing the trapped fluid in the blind end of main lift cylinders 124 as well as the rod end of down pressure cylinders 186. When the fluid is drained from the blind end of main lift cylinders 124, it permits the upper and lower parallel link assemblies 120 and 122 to pivot simultaneously about pins in the parallel link mounts 134 enabling a vertical translation of the toolbar assembly 46 with minimal deviation from its level orientation. When the fluid is released from the rod end of the down pressure cylinder 186 it allows the main wing 66 to rotate about the main wing hinge pin 210 and the main wing latch pin 212. This rotational motion causes the main wing 66 to lower proportionally to the distance away from main wing hinge pin 210 thereby lowering incorporation tools clamped latitudinal along the main wing 66 and flip wing 68.

Once the application tools, such as coulters 48 engage the ground, the rod end of the main lift cylinders 124 and the blind end of the down pressure cylinders 186 can be pressurized to force the application tool, coulter 48 into the soil.

When the rod end of the main lift cylinder 124 is pressurized it exerts a downward resultant vertical force on the lower parallel link 122 which is thereby transferred into the center section assembly 64 through the parallel link mounts 134 (FIG. 7). The penetration depth of tools attached to the center section is controlled by the amount of retracted stroke length of the main lift cylinders 124 relative to the drawbar height of the prime mover and the carriage wheels 52.

When the blind end of the hydraulic down pressure cylinders 186 is pressurized the rod end exerts a linear force directed away from the flex hinge 60, thereby pivoting main wings 66 downward and increasing a resulting downward vertical force applied to attached incorporation tools to cause them to effectively penetrate the soil to a desired depth. The desired incorporation depth is controlled by raising or lowering the gage wheels 50 Adjusting the amount of fluid pressure applied to the blind end of the hydraulic down pressure cylinder 186 regulates the amount of gravitational load that is transferred to the main wing 66 and allows the down pressure cylinders 186 to retract and extend as needed for the main wing 66 and flip wing 68 assemblies to follow the ground contour during the application process.

To raise the toolbar 46 from the ground the blind end of the main lift cylinders 124 and the rod end of the down pressure cylinders 186 are pressurized. This redirects the resultant force applied to the lower parallel links 122 from a downward vertical force to an upward force thereby raising the toolbar assembly 46.

Of course, reversing the flow to the hydraulic down pressure cylinder 186 and pressurizing the rod end of the down pressure cylinders 186 will reverse the resultant forces and cause the main wing 66 to roll up to a controlled height thereby providing the additional lift height to the main wing 66 and outer flip wing 68 assemblies for crop clearance during turns.

With reference to FIGS. 2, 15, and 28, when it is desired to fold a flip wing 68 into the transport position, the flip wing hydraulic cylinder 324 is retracted creating a moment through the flip wing linkage assembly 306 about the flip wing hinge until the flip wing tube 294 (FIG. 28) is inverted and rests on the bumper 370 bolted to the top of the flip wing rest tube 262.

To fold a main wing back into the transport position as shown in FIG. 24, the rod end of the latch cylinder 158 (FIG. 26) is first pressurized to rotate the latch assembly 62 about the latch pin 214 and release the main wing latch pin 212 from the latch assembly 62. As shown in FIGS. 24, 25 and 31, the main wing 66 is folded back into the transport position by extending the side fold cylinder 174 causing the flex hinge 60 to rotate about the flex hinge pin 142 until the rear rectangular tube 232 on the main wing 66 contacts a poly pad 372 that is fastened to the vertical tube 108 on the transport rack 56. Trapped oil in the rod end of the down pressure cylinder 186 is released to lower the outer end of the main wing 66 onto the standoff tubes 96 of the transport rack. The standoff tubes 96 on the transport rack 56 transmit a resultant vertical support opposite the gravitational loading on outer end of the main wing 66 thereby eliminating the moment that would otherwise be present about the flex hinge assembly 60. The formed transport lock plates 278 capture the transport peg 100 and mechanically secure the main wings 66 in the side folded position eliminating the reliance on the side fold cylinder 174.

With the toolbar folded for transport as shown in FIG. 3, the chemical applicator can now be safely and easily moved from one location to another.

Obviously, many modifications and variations of the present invention are possible in light of the above teachings. It is therefore understood that, within the scope of the appended claims, the invention may be practiced otherwise than as specifically described.

What is claimed is:

1. A multi-row side-folding toolbar for a multi-row agricultural implement comprising:
   (a) a center section adapted to be pivotally secured to an associated carriage frame through parallel link arrangements, said center section being forward of said carriage frame;
   (b) a pair of main wing sections extending out from and flanking said center section, each main wing section having a first end connected to said center section and a second end;
   (c) a pair of unitary flex hinge structures, one connecting the first end of each main wing section to an associated end of said center section, each unitary flex hinge structure being configured to fold a corresponding one of the main wing sections rearwardly to a position adjacent said carriage frame, wherein each of said unitary flex hinge structures provides a dual pivotal function and in a first aspect comprises a side fold hinge having an upper hinge mount including an upper collar that defines an upper aperture, a lower hinge mount including a lower collar that defines a lower aperture, and a cylinder lug mounting plate, the upper hinge mount and the lower hinge mount being directly attached to and vertically separated by said cylinder lug mounting plate and being mounted to pivot about a generally vertical axis defined by a hinge pin disposed on said center section and in a second aspect is connected to the first end of a corresponding one of said main wing sections by a generally horizontal pivotal connection with said corresponding one of said main wing sections, each of said unitary flex hinge structures further comprising a down pressure lug plate having a vertically extending edge that is adjacent said upper collar, said vertically extending edge being in substantial vertical alignment with said cylinder lug mounting plate, said upper hinge mount being mounted to said down pressure lug plate;
   (d) a latch mechanism including a latch member disposed to operate between the center section and the first end of each connected main wing section for selectively securing each of said pair of main wing sections in parallel relation to said center section, said latch mechanism including an alignment arrangement including opposed guiding wear plates; and
   (e) a plurality of actuator devices for selectively pivoting each of said flex hinge structures generally horizontally to rearwardly-fold and unfold each main wing section, pivoting each main wing section generally vertically, and operating each latch member, said plurality of actuator devices including a pair of force-applying linear actuators, each connected to a respective one of said down pressure lug plates and a respective leveraging structure on said corresponding one of said main wing sections, each force-applying linear actuator being configured to pivot said corresponding one of said main wing sections about said generally horizontal axis and to selectively raise or apply an amount of down force to said corresponding one of said main wing sections, each of said force-applying linear actuators being configured to exert a force that is coplanar with a mid plane of said down pressure lug plate, said mid plane coinciding with said generally vertical axis of said hinge pin.

2. A side-folding toolbar as in claim 1 further comprising a pair of outer generally vertically pivoting foldable wing sections extending out from and flanking said main wing sections, and being pivotally secured thereto about a generally horizontal axis, said outer foldable wing sections being generally parallel to said main wing sections in a deployed field position and pivotally foldable to rest on top of said main wing sections in a transport position and an actuator device for selectively pivoting each of said outer foldable wing sections.

3. A side-folding toolbar as in claim 2 wherein said plurality of actuator devices further comprises a force-applying linear actuator connected between each of said flex hinge members and a leveraging structure on a corresponding one of said main wing sections to pivot said main wing section about said generally horizontal axis to selectively raise or apply an amount of down force to said corresponding main wing section.

4. A side-folding toolbar as in claim 3 wherein said center section further comprises a plurality of link assemblies for fixing said side-folding toolbar to an associated carrier frame, said link assemblies being adapted to receive actuators connected to said associated carriage frame to selectively raise and lower said side-folding toolbar relative to said carriage frame.

5. A side-folding toolbar as in claim 1 wherein said center section further comprises a plurality of link assemblies for fixing said toolbar to an associated carrier frame, said link assemblies being adapted to receive actuators connected to said associated carriage frame to selectively raise and lower said toolbar relative to said carriage frame.

6. A side-folding toolbar as in claim 5 comprising actuators received by said link assemblies in the form of hydraulic or pneumatic cylinders.

7. A side-folding toolbar as in claim 1 wherein said actuator devices comprise linear actuators.

8. A side-folding toolbar as in claim 7 wherein said actuator devices are hydraulic or pneumatic cylinders.

9. A side-folding toolbar as in claim 1 wherein each said latch member is a vertically pivoting latch member mounted on said center section that captures a latch pin on a corresponding main wing section and said alignment arrangement comprises a guiding wear plate on said main wing section that contacts a corresponding wear plate on a receiver ramp on the main wing section for assuring proper alignment of said latch mechanism with a corresponding one of said main wing sections as it is rotated into position.

10. A side-folding toolbar as in claim 1 further comprising a toolbar offset assembly attached to each end of the center section on said toolbar for attaching incorporation tools at a location that coincides with said latch mechanism.

11. The multi-row side-folding toolbar of claim 1, wherein said upper hinge mount and said lower hinge mount are hinge castings.

12. A multi-row agriculture implement system comprising:
(a) a towed trailer carriage assembly adapted to be pivotally attached to a prime mover and further comprising a rolling carrier frame for carrying an application storage reservoir and supporting a rearward-folding toolbar, said frame comprising a transport rack support assembly behind the storage reservoir;
(b) said rearward-folding toolbar carried by said carriage assembly, further comprising:
(i) an independent center section adapted to be pivotally secured to said carrier frame through parallel link arrangements;
(ii) a pair of main wing sections extending out from and flanking said center section, each main wing section having a first end connected to said center section and a second end;
(iii) a pair of unitary flex hinge structures, one connecting the first end of each main wing section to an associated end of said center section, wherein each of said unitary flex hinge structures provides a dual pivotal function and in a first aspect comprises a side fold hinge having an upper hinge mount including an upper collar that defines an upper aperture and a lower hinge mount including a lower collar that defines a lower aperture, and a cylinder lug mounting plate, the upper hinge mount and the lower hinge mount being directly attached to and vertically separated by said cylinder lug mounting plate and being mounted to pivot about a generally vertical axis defined by a hinge pin disposed on said center section and in a second aspect is connected to the first end of a corresponding one of said pair of main wing sections by a generally horizontal pivotal connection with said corresponding one of said main wing sections, each of said unitary flex hinge structures further comprising a down pressure lug plate having a vertically extending edge that is adjacent said upper collar, said vertically extending edge being in substantial vertical alignment with said cylinder lug mounting plate, said upper hinge mount being mounted to said down pressure lug plate;
(iv) a latch mechanism including a latch member disposed to operate between the center section and the first end of each connected main wing sections for selectively securing each of said pair of main wing sections in parallel relation to said center section, said latch mechanism including an alignment arrangement including guiding wear plates; and
(v) a plurality of actuator devices for selectively pivoting each of said flex hinge structures generally horizontally to rearwardly-fold and unfold each main wing section, pivoting each main wing section generally vertically, and operating each latch member, said plurality of actuator devices including a pair of force-applying linear actuators, each connected to a respective one of said down pressure lug plates and a respective leveraging structure on said corresponding one of said main wing sections, each force-applying linear actuator being configured to pivot said corresponding one of said main wing sections about said generally horizontal axis and to selectively raise or apply an amount of down force to said corresponding one of said main wing sections, each of said force-applying linear actuators being configured to exert a force that is coplanar with a mid plane of said down pressure lug plate, said mid plane coinciding with said generally vertical axis of said hinge pin.

13. A multi-row agriculture implement system as in claim 12 further comprising a pair of outer generally vertically pivoting foldable wing sections extending out from and flanking said main wing sections, and being pivotally secured thereto about a generally horizontal axis, said outer foldable wing sections being generally parallel to said main wing sections in a deployed field position and pivotally foldable to rest on top of said main wing sections in a transport position and an actuator device for selectively pivoting each of said outer foldable wing sections.

14. A multi-row agriculture implement system as in claim 13 wherein said plurality of actuator devices further comprises a force-applying actuator connected between each of said flex hinge members and said corresponding one of said main wing sections to pivot said main wing section about said generally horizontal axis to selectively raise or apply an amount of down force to said corresponding main wing section.

15. A multi-row agriculture implement system as in claim 14 wherein said center section further comprises a plurality of link assemblies for fixing said rearward-folding toolbar to said carrier frame, said link assemblies being adapted to receive actuators connected to said associated carriage frame to selectively raise and lower said rearward-folding toolbar relative to said carriage frame.

16. A multi-row agriculture implement system as in claim 15 comprising actuator devices for said link assemblies in the form of hydraulic or pneumatic cylinders.

17. A multi-row agriculture implement system as in claim 12 wherein said center section further comprises a plurality of link assemblies for fixing said rearward-folding toolbar to an associated carrier frame, said link assemblies being adapted to receive actuators connected to said associated carriage frame to selectively raise and lower said toolbar relative to said carriage frame.

18. A multi-row agriculture implement system as in claim 12 wherein said actuator devices are hydraulic or pneumatic cylinders.

19. A multi-row agriculture implement system as in claim 12 further comprising a toolbar offset assembly attached to each end of the center section on said rearward-folding toolbar for attaching incorporation tools at a location that coincides with said latch mechanism.

20. A multi-row agriculture implement as in claim 12 wherein each said latch member is a vertically pivoting latch member mounted on said center section that captures a latch pin on a corresponding one of said main wing sections and said alignment arrangement comprises a guiding wear plate on said main wing section that contacts a corresponding wear plate on a receiver ramp on the main wing section is provided for assuring proper alignment, said latch mechanism with said corresponding one of said main wing sections as the main wing section is rotated into position.

21. The multi-row side-folding toolbar of claim 12, wherein said upper hinge mount and said lower hinge mount are hinge castings.

* * * * *